United States Patent
Jones et al.

(10) Patent No.: US 7,493,437 B1
(45) Date of Patent: Feb. 17, 2009

(54) FLASHTOASTER FOR READING SEVERAL TYPES OF FLASH MEMORY CARDS WITH OR WITHOUT A PC

(75) Inventors: Larry Lawson Jones, Palo Alto, CA (US); Sreenath Mambakkam, San Jose, CA (US); Arockiyaswamy Venkidu, Menlo Park, CA (US)

(73) Assignee: MCM Portfolio LLC, Cupertino, CA (US)

( * ) Notice: Subject to any disclaimer, the term of this patent is extended or adjusted under 35 U.S.C. 154(b) by 0 days.

(21) Appl. No.: 11/003,185

(22) Filed: Dec. 2, 2004

Related U.S. Application Data

(63) Continuation-in-part of application No. 10/039,685, filed on Oct. 29, 2001, now Pat. No. 6,832,281, which is a continuation-in-part of application No. 09/610,904, filed on Jul. 6, 2000, now Pat. No. 6,438,638.

(51) Int. Cl.
*G06F 13/00* (2006.01)
*G06F 1/16* (2006.01)

(52) U.S. Cl. ........................................ 710/301; 710/303
(58) Field of Classification Search ................. 710/301, 710/303
See application file for complete search history.

(56) References Cited

U.S. PATENT DOCUMENTS 4,092,732 A    5/1978    Ouchi (Continued)

FOREIGN PATENT DOCUMENTS

DE           20109810 U      8/2001

(Continued)

OTHER PUBLICATIONS

Supplementary Search Report for EP Application No. 01952974.2, 3 pages, Sep. 21, 2004.

(Continued)

*Primary Examiner*—Paul R Myers
(74) *Attorney, Agent, or Firm*—Greenberg Traurig, LLP

(57) ABSTRACT

A single-slot multi-flash-card reader is disclosed. The flash-card reader includes an Integrated Device Electronics (IDE) interface for transferring data to a personal computer; and an IDE converter, coupled to the IDE interface, for converting multiple flash-card interfaces to a format used by the personal computer interface. The multiple flash-card interfaces include a COMPACTFLASH interface and smaller interfaces having fewer pins that the COMPACTFLASH interface. The flash-card reader includes a COMPACTFLASH connector, coupled to the IDE converter, for receiving a COMPACTFLASH card through a single slot in the single-slot multi-flash-card reader, the COMPACTFLASH connector making electrical connection with the COMPACTFLASH card for signals in the COMPACTFLASH interface. The flash-card reader also includes an adapter, having a physical shape to remove or insert into the COMPACTFLASH connector. The adapter has a mating COMPACTFLASH connector that fits the COMPACTFLASH connector. The adapter also has a smaller connector, the smaller connector for fitting to other flash memory cards having the smaller interfaces. The reader includes a wiring means, in the adapter, connected between the smaller connector and the mating COMPACTFLASH connector, for directly connecting signals from the smaller connector in the smaller interface with signals in the mating COMPACTFLASH connector. The adapter allows the other flash memory cards having the smaller interfaces to fit into the COMPACTFLASH connector through the single slot to be read by the IDE converter. A system and method in accordance with the present invention allows an IDE interface to replace the USB interface. This will allow a flash reader to be built that could be put into the front panel of a PC in a manner that is similar to placing a CD-ROM into the front panel.

14 Claims, 13 Drawing Sheets

U.S. PATENT DOCUMENTS

| | | | |
|---|---|---|---|
| 5,296,692 A | 3/1994 | Shino | |
| 5,394,206 A | 2/1995 | Cocca | |
| 5,396,617 A | 3/1995 | Villwock et al. | |
| 5,436,621 A * | 7/1995 | Macko et al. | 340/7.54 |
| 5,437,020 A | 7/1995 | Wells et al. | |
| 5,471,038 A | 11/1995 | Eisele et al. | |
| 5,485,606 A | 1/1996 | Midgdey | |
| 5,497,464 A | 3/1996 | Yeh | |
| 5,522,049 A | 5/1996 | Kimura et al. | |
| 5,538,436 A * | 7/1996 | Garney | 439/270 |
| 5,576,698 A | 11/1996 | Card et al. | |
| 5,584,043 A | 12/1996 | Burkart | |
| 5,589,719 A | 12/1996 | Fiset | |
| 5,596,562 A * | 1/1997 | Chen | 710/315 |
| 5,604,917 A | 2/1997 | Saito et al. | |
| 5,630,174 A * | 5/1997 | Stone et al. | 710/63 |
| 5,640,541 A | 6/1997 | Bartram et al. | |
| 5,679,007 A | 10/1997 | Potdevin et al. | |
| 5,708,799 A | 1/1998 | Gafken et al. | |
| 5,717,951 A | 2/1998 | Yabumoto | |
| 5,729,204 A | 3/1998 | Fackler et al. | |
| 5,734,894 A | 3/1998 | Adamson et al. | |
| 5,740,349 A | 4/1998 | Hasbun et al. | |
| 5,752,857 A | 5/1998 | Knights | |
| 5,786,769 A | 7/1998 | Coteus et al. | |
| 5,790,878 A | 8/1998 | Anderson et al. | |
| 5,802,533 A | 9/1998 | Walker | |
| 5,805,834 A * | 9/1998 | McKinley et al. | 710/302 |
| 5,815,426 A * | 9/1998 | Jigour et al. | 365/51 |
| 5,828,905 A | 10/1998 | Rao | |
| 5,844,910 A | 12/1998 | Niijima et al. | |
| 5,844,911 A | 12/1998 | Schadegg et al. | |
| 5,877,975 A | 3/1999 | Jigour et al. | |
| 5,887,145 A | 3/1999 | Harari et al. | |
| 5,892,213 A | 4/1999 | Ito | |
| 5,905,888 A | 5/1999 | Jones et al. | |
| 5,928,347 A * | 7/1999 | Jones | 710/305 |
| 5,928,370 A * | 7/1999 | Asnaashari | 714/48 |
| 5,929,416 A | 7/1999 | Dos Santos Pato et al. | |
| 5,930,496 A | 7/1999 | MacLaren et al. | |
| 5,933,328 A | 8/1999 | Wallace et al. | |
| 5,956,473 A | 9/1999 | Ma et al. | |
| 5,961,652 A | 10/1999 | Thompson | |
| 5,964,885 A | 10/1999 | Little et al. | |
| 5,974,426 A | 10/1999 | Lee et al. | |
| D416,541 S | 11/1999 | Hirai et al. | |
| 5,995,376 A | 11/1999 | Schultz et al. | |
| 6,002,605 A | 12/1999 | Iwasaki et al. | |
| 6,006,295 A | 12/1999 | Jones et al. | |
| 6,009,492 A | 12/1999 | Matsuoka | |
| 6,010,066 A | 1/2000 | Itou | |
| 6,011,741 A | 1/2000 | Wallace et al. | |
| 6,015,093 A | 1/2000 | Barrett et al. | |
| 6,026,007 A | 2/2000 | Jigour et al. | |
| 6,038,400 A | 3/2000 | Bell et al. | |
| 6,061,746 A * | 5/2000 | Stanley et al. | 710/10 |
| 6,062,887 A | 5/2000 | Schuster et al. | |
| 6,067,234 A | 5/2000 | Kim et al. | |
| 6,075,706 A | 6/2000 | Learmonth et al. | |
| 6,079,621 A | 6/2000 | Vardanyan et al. | |
| 6,088,755 A | 7/2000 | Kobayashi et al. | |
| 6,088,802 A | 7/2000 | Bialick et al. | |
| 6,097,605 A | 8/2000 | Klatt et al. | |
| 6,102,715 A | 8/2000 | Centofante | |
| 6,112,014 A | 8/2000 | Kane | |
| 6,132,223 A | 10/2000 | Seeley et al. | |
| 6,137,710 A | 10/2000 | Iwasaki et al. | |
| 6,145,046 A | 11/2000 | Jones | |
| 6,170,029 B1 | 1/2001 | Kelley et al. | |
| 6,170,066 B1 | 1/2001 | See | |
| 6,173,291 B1 | 1/2001 | Jenevein | |
| 6,175,517 B1 | 1/2001 | Jigour et al. | |
| 6,182,162 B1 | 1/2001 | Estakhri et al. | |
| 6,189,055 B1 * | 2/2001 | Eisele et al. | 710/62 |
| 6,199,122 B1 | 3/2001 | Kobayashi | |
| 6,202,932 B1 | 3/2001 | Rapeli | |
| 6,203,378 B1 | 3/2001 | Shobara et al. | |
| 6,226,202 B1 | 5/2001 | Kikuchi | |
| 6,264,506 B1 * | 7/2001 | Yasufuku et al. | 439/638 |
| 6,266,724 B1 | 7/2001 | Harari et al. | |
| 6,279,069 B1 | 8/2001 | Robinson et al. | |
| 6,282,612 B1 | 8/2001 | Sakajiri et al. | |
| 6,292,863 B1 | 9/2001 | Terasaki et al. | |
| 6,317,352 B1 | 11/2001 | Halbert et al. | |
| 6,330,688 B1 | 12/2001 | Brown | |
| 6,353,870 B1 | 3/2002 | Mills et al. | |
| 6,381,662 B1 | 4/2002 | Harari et al. | |
| 6,385,677 B1 * | 5/2002 | Yao | 711/115 |
| 6,386,920 B1 | 5/2002 | Sun | |
| 6,402,558 B1 | 6/2002 | Hung-Ju et al. | |
| 6,405,323 B1 * | 6/2002 | Lin et al. | 714/8 |
| 6,408,352 B1 * | 6/2002 | Hosaka et al. | 710/301 |
| 6,413,108 B2 | 7/2002 | Centofante | |
| 6,426,801 B1 | 7/2002 | Reed | |
| 6,438,638 B1 | 8/2002 | Jones et al. | |
| 6,468,101 B2 | 10/2002 | Suzuki | |
| 6,470,284 B1 | 10/2002 | Oh et al. | |
| 6,482,029 B2 | 11/2002 | Nishimura | |
| 6,490,163 B1 | 12/2002 | Pua et al. | |
| 6,581,830 B1 | 6/2003 | Jelinek et al. | |
| 6,599,147 B1 | 7/2003 | Mills et al. | |
| 6,601,124 B1 | 7/2003 | Blair | |
| 6,607,405 B2 | 8/2003 | Nishimura | |
| 6,658,202 B1 | 12/2003 | Battaglia | |
| 6,658,516 B2 | 12/2003 | Yao | |
| 6,663,007 B1 | 12/2003 | Sun | |
| 6,666,724 B1 | 12/2003 | Lwee | |
| 6,675,233 B1 * | 1/2004 | Du et al. | 710/14 |
| 6,684,283 B1 | 1/2004 | Harris et al. | |
| 6,705,529 B1 | 3/2004 | Kettunen et al. | |
| 6,738,259 B2 | 5/2004 | Le et al. | |
| 6,746,280 B1 | 6/2004 | Lu et al. | |
| 6,761,313 B2 | 7/2004 | Hsieh et al. | |
| 6,761,320 B1 | 7/2004 | Chen | |
| 6,808,424 B2 | 10/2004 | Kaneshiro et al. | |
| 6,859,369 B2 | 2/2005 | Mambakkam et al. | |
| 6,973,535 B2 * | 12/2005 | Bruner et al. | 711/112 |
| 7,062,584 B1 | 6/2006 | Worrell et al. | |
| 7,065,591 B2 | 6/2006 | Han et al. | |
| 7,093,161 B1 | 8/2006 | Mambakkam et al. | |
| 7,095,618 B1 | 8/2006 | Mambakkam et al. | |
| 7,162,547 B2 | 1/2007 | Hosaka et al. | |
| 7,191,270 B2 | 3/2007 | Oh et al. | |
| 7,252,240 B1 | 8/2007 | Jones et al. | |
| 7,278,051 B2 | 10/2007 | Mambakkam et al. | |
| 7,295,443 B2 | 11/2007 | Mambakkam et al. | |
| 7,412,552 B2 | 8/2008 | Jones et al. | |
| 2001/0014934 A1 | 8/2001 | Toba | |
| 2001/0039603 A1 | 11/2001 | Manowitz | |
| 2002/0069363 A1 | 6/2002 | Winburn | |
| 2002/0111771 A1 | 8/2002 | Huang et al. | |
| 2002/0178307 A1 | 11/2002 | Pua et al. | |
| 2002/0185533 A1 | 12/2002 | Shieh et al. | |
| 2003/0038177 A1 | 2/2003 | Morrow | |
| 2003/0041203 A1 | 2/2003 | Jones et al. | |
| 2003/0041284 A1 | 2/2003 | Mambakkam et al. | |
| 2003/0046469 A1 | 3/2003 | Liu et al. | |
| 2003/0070112 A1 | 4/2003 | York | |
| 2003/0084220 A1 | 5/2003 | Jones et al. | |
| 2003/0084221 A1 | 5/2003 | Jones et al. | |
| 2003/0093606 A1 | 5/2003 | Mambakkam et al. | |
| 2004/0027879 A1 | 2/2004 | Chang | |
| 2006/0059385 A1 | 3/2006 | Atri et al. | |
| 2006/0242460 A1 | 10/2006 | Mambakkam et al. | |

| | | | |
|---|---|---|---|
| 2006/0253636 | A1 | 11/2006 | Jones et al. |
| 2007/0180177 | A1 | 8/2007 | Jones et al. |
| 2007/0288677 | A1 | 12/2007 | Mambakkam et al. |
| 2008/0009196 | A1 | 1/2008 | Mambakkam et al. |
| 2008/0017718 | A1 | 1/2008 | Jones et al. |

FOREIGN PATENT DOCUMENTS

| | | |
|---|---|---|
| EP | 0775964 A2 | 9/1996 |
| EP | 0987876 A2 | 8/1997 |
| EP | 1043884 A1 | 10/2000 |
| EP | 1139208 A1 | 10/2001 |
| JP | 6195524 | 7/1994 |
| JP | 08235028 A | 9/1996 |
| JP | 1115928 | 1/1999 |
| JP | 11053485 A | 2/1999 |
| TW | 490889 | 6/2002 |
| WO | 0023936 | 4/2000 |
| WO | 2004027617 | 4/2004 |

OTHER PUBLICATIONS

Actiontec, "CameraConnect Pro," 1 page, available at least by Oct. 29, 1998.

Actiontec, "CameraConnect Pro Parellel Port Flash Card Reader User's Manual," 29 pages, available at least by Oct. 28, 1999.

Antec, Inc., "PhotoChute3 USB," product manual, pp. 18 pages, available at least by Apr. 26, 1999.

CompactFlash Association, "CF+ and Compact Flash Specification," Rev. 1.4, 5 pages, Jul. 1999.

CQ Publishing of Japan, "Interface," pp. 52-131, Dec. 1, 1999 (article and English translation).

DataFab Systems, Inc., "DataFab Systems Inc., leading in portable storage systems, is now offering dual-slot CompactFlash and SmartMedia card reader," press release, 1 page, Sep. 10, 1999.

Microtech International, Inc., "Microtech Digital Photography Solutions," 2 pages, available at least by Feb. 26, 2000.

Microtech International, Inc., "PCD-47 User's Manual," Version 1.1, pp. 35 pages, available at least by May 24, 2000.

Microtech International, Inc., "Microtech PCD-47B SCSI Digital Film Reader/Writer," 2 pages, availabe at least by May 24, 2000.

Microtech International, Inc., "Microtech Delivers Industry's First 3 Slot SCSI Digital Film Reader," press release, 2 pages, Jan. 5, 2000.

Microtech International, Inc., "Microtech USB CameraMate Supports IBM Microdrive," press release, 3 pages, Feb. 18, 1999.

Steve's Digicams, "Microtech USB CameraMate User Review," 4 pages, Sep. 5, 1999.

Steve's Digicams, "CardMate PCF-100 User Review," 5 pages, Apr. 12, 1999.

Twice.com, "Digital Imaging Well Exposed at RetailVision," 1 page, Apr. 26, 1999.

Lexar Media Web Pages—Parallel Port, Universal Readers, FAQ, Jumpshot, Jun. 5, 2000.

Microtouch Smart Media to PCMCIA Adapter Product Sheet, Jun. 8, 2000.

Burge, Legand L., et al., "A Ubiquitous Stable Storage for Mobile Computing Devices," ACM, Proceedings of the 2001 ACM Symposium on Applied Computing, pp. 401-404, Mar. 2001.

DataRescue sa/nv, Inc., "PhotoRescue User's Guide," rev. 1.0, pp. 1-8, 2001.

DataRescue sa/nv, Inc., DataRescue Home Page, located at http://web.archive.org/web/20010722191109/http://datarescue.com, archived Jul. 22, 2001.

DataRescue sa/nv, Inc., DataRescue PhotoRescue™ Specifications, located at http://web.archive.org/web/20010827073251/www.datarescue.com/photorescue/spec.htm, archived Aug. 27, 2001.

Galbraith, Rob, "Building the Ultimate Photo Recovery Kit," located at http://www.robgalbraith.com/bins/content_page.asp?cid=7-4419-4501, Jan. 23, 2002.

Lexmark International, Inc., Service Manual for 5000 and 5700 Color Jetprinter & 5770 Photo Jetprinter, Oct. 2000.

Ontrack Data International, Inc., "EasyRecovery™ Professional Edition User Guide," pp. 1-45, 2000.

USPTO, Transaction History for U.S. Appl. No. 10/167,925, now U.S. Patent No. 7,222,205.

USPTO, Transaction History for U.S. Appl. No. 11/671,410.

USPTO, Transaction History for U.S. Appl. No. 12/139,425.

USPTO, Transaction History for U.S. Appl. No. 10/039,685, now U.S. Patent No. 6,832,281.

USPTO, Transaction History for U.S. Appl. No. 09/610,904, now U.S. Patent No. 6,438,638.

* cited by examiner

| Pin | CF | Smart Media | MMC/SD | Memory Stick |
|---|---|---|---|---|
| 1 | Ground | Ground | Ground | Ground |
| 2 | D3 | D3 | --- | --- |
| 3 | D4 | D4 | --- | --- |
| 4 | D5 | D5 | --- | --- |
| 5 | D6 | D6 | --- | --- |
| 6 | D7 | D7 | --- | --- |
| 7 | -CE1 | -SMCS | --- | --- |
| 8 | A10 | --- | --- | --- |
| 9 | -OE | -OE | --- | --- |
| 10 | A9 | --- | --- | --- |
| 11 | A8 | --- | --- | --- |
| 12 | A7 | --- | --- | --- |
| 13 | Power | Power | Power | Power |
| 14 | A6 | CLE | | |
| 15 | A5 | ALE | | |
| 16 | A4 | READY | | |
| 17 | A3 | -WP | | |
| 18 | A2 | LVD | SERCLK | SERCLK |
| 19 | A1 | | DATAIO | DATAIO |
| 20 | A0 | | CMD | BITSET |
| 21 | D0 | D0 | | |
| 22 | D1 | D1 | | |
| 23 | D2 | D2 | | |
| 24 | --- | --- | --- | --- |
| 25 | -CD2 | -CD2 | -CD2 | -CD2 |
| 26 | -CD1 | -CD1 | -CD1 | -CD1 |
| 27 | D11 | --- | --- | --- |
| 28 | D12 | --- | --- | --- |
| 29 | D13 | --- | --- | --- |
| 30 | D14 | --- | --- | --- |
| 31 | D15 | --- | --- | --- |
| 32 | -CE2 | --- | --- | --- |
| 33 | --- | --- | --- | --- |
| 34 | tie high | --- | --- | --- |
| 35 | tie high | --- | --- | --- |
| 36 | -WE | -WE | --- | --- |
| 37 | INTRQ | --- | --- | --- |
| 38 | Power | Power | Power | Power |
| 39 | --- | --- | --- | --- |
| 40 | --- | --- | --- | --- |
| 41 | RESET | --- | --- | --- |
| 42 | --- | --- | --- | --- |
| 43 | --- | --- | --- | --- |
| 44 | -REG | --- | --- | --- |
| 45 | --- | --- | --- | --- |
| 46 | --- | --- | --- | --- |
| 47 | D8 | --- | --- | --- |
| 48 | D9 | --- | --- | --- |
| 49 | D10 | --- | --- | --- |
| 50 | Ground | Ground | Ground | Ground |

FIG. 5

US 7,493,437 B1

FLASHTOASTER FOR READING SEVERAL TYPES OF FLASH MEMORY CARDS WITH OR WITHOUT A PC

CROSS-REFERENCE TO RELATED APPLICATIONS

Under 35 U.S.C § 120, this application is a Continuation-In-Part of application Ser. No. 10/039,685, now U.S. Pat. No. 6,832,281, entitled "FLASHTOASTER FOR READING SEVERAL TYPES OF FLASH MEMORY CARDS WITH OR WITHOUT A PC," filed Oct. 29, 2001, which is a Continuation-In-Part of application Ser. No. 09/610,904, now U.S. Pat. No. 6,438,638, entitled "FLASHTOASTER FOR READING SEVERAL TYPES OF FLASH MEMORY CARDS WITH OR WITHOUT A PC," filed Jul. 6, 2000.

TECHNICAL FIELD

The present invention relates generally to flash memory readers, and more particularly to interfacing several different types of flash memory cards to a personal computer or any computing appliance.

BACKGROUND

Digital cameras have become one of the most popular of electronic devices. In a recent year, more digital cameras were sold than traditional film cameras. Images from digital cameras can be downloaded and stored on personal computers. Digital pictures can be converted to common formats such as JPEG and sent as e-mail attachments or posted to virtual photo albums on the Internet. Video as well as still images can be captured, depending on the kind of digital camera.

Digital cameras typically capture images electronically and ultimately store the images as bits (ones and zeros) on a solid-state memory. Flash memory is the most common storage for digital cameras. Flash memory contains one or more electrically-erasable read-only-memory (EEPROM) integrated circuit chips that allow reading, writing, and block erasing.

Early digital cameras required the user to download or transfer the images from the flash memory within the digital camera to a personal computer (PC). A standard serial cable was most widely used. However, the limited transfer rate of the serial cable and the large size of the digital images made such serial downloads a patience-building experience. Serial downloads could easily take half an hour for only a few dozen images.

Digital camera manufacturers solved this problem by placing the flash memory chips on a small removable card. The flash memory card could then be removed from the digital camera, much as film is removed from a standard camera. The flash memory card could then be inserted into an appropriate slot in a PC, and the image files directly copied to the PC.

FIG. 1A shows a flash memory card and adapter for transferring images from a digital camera to a PC. A user takes pictures with digital camera 14 that are stored in image files on flash memory chip(s). The flash memory chip is contained in COMPACTFLASH card 16, which can be removed from digital camera 14 by pressing a card-eject button. Thus COMPACTFLASH card 16 contains the image files. COMPACTFLASH is a trademark of SanDisk Corporation.

While some smaller hand-held computers or personal-digital-assistants (PDAs) have slots that receive COMPACTFLASH cards, most PCs do not. Laptop or notebook PCs have PC-card (earlier known as PCMCIA, Personal Computer Memory Card International Association) slots that can receive PCMCIA cards. Many functions have been placed on PCMCIA cards, such as modems, Ethernet, flash memory, encryption keys, and even miniature hard drives.

CF-to-PCMCIA adapter 10 is a passive adapter that contains an opening that receives COMPACTFLASH card 16. FIG. 1B shows CF-to-PCMCIA adapter 10 with COMPACTFLASH card 16 inserted. Such CF-to-PCMCIA adapters 10 sell for as little as $5-10.

FIG. 1C shows a PC connected to a PCMCIA reader. Most laptop and notebook PCs contain one or two PCMCIA slots 22 that CF-to-PCMCIA adapter 10 can fit into. In this case, the user merely has to copy the image files from COMPACTFLASH card 16 to the hard disk of PC 20. Since high-speed parallel buses are used, transfer is rapid, about the same speed as accessing the hard disk. Thus a half-hour serial-cable transfer can be reduced to less than a minute with the $5 CF-to-PCMCIA adapter.

Desktop PCs usually do not have PCMCIA slots. In this case, PCMCIA reader 12 can be used. PCMCIA reader 12 accepts CF-to-PCMCIA adapter 10 and connects to PC 20 through a parallel or high-speed Universal Serial Bus (USB) cable.

Multiple Flash-Card Formats

Although the COMPACTFLASH card format is relatively small, being not much more than an inch square, other smaller cards have recently emerged. FIG. 2A illustrates various formats of flash memory cards used with digital cameras. Many digital cameras still use COMPACTFLASH card 16, which can be inserted into CF-to-PCMCIA adapter 10 for transfer to a PC. Other smaller, thinner formats have emerged and are used with some manufacturer's digital cameras. For example, SMARTMEDIA card 24 is less than half an inch long, yet has enough flash memory capacity for dozens of images. SMARTMEDIA-to-PCMCIA adapter 10 is available commercially for about $60. The higher cost is believed to be due to a converter chip within adapter 10. Also, different adapters 10 are required for different memory capacities of SMARTMEDIA card 24. SMARTMEDIA is a trademark of Toshiba Corporation.

Other kinds of flash memory cards that are being championed by different manufacturers include MultiMediaCard (MMC) 28 and the related Secure Digital card (SD) 26. MMC is controlled by the MultiMediaCard Association, which includes SanDisk Corporation, Infineon Technologies AG, and others, while SD is controlled by the SD Group, which includes Matsushita Electric Industrial Co., SanDisk Corporation, and Toshiba Corporation. Another emerging form factor from Sony is MEMORY STICK 18. MEMORY STICK cards have a PCMCIA/Floppy adapter while MMC cards have a floppy adapter. MEMORY STICK is a trademark of Sony Corporation.

The different physical shapes and pin arrangements of cards 24, 26, 28 and MEMORY STICK card 18 prevent their use in CF-to-PCMCIA adapter 10. Indeed, most of these cards 24, 26, 28 have less than a dozen pins, while COMPACTFLASH card 16 has a larger 50-pin interface. Furthermore, serial data interfaces are used in the smaller cards 24, 26, 28 while a parallel data bus is used with COMPACTFLASH card 16.

FIG. 2B shows a MEMORY STICK-to-PCMCIA adapter using an active converter chip. MEMORY STICK card 18 fits into an opening in MEMORY STICK-to-PCMCIA adapter 15, allowing adapter 15 and MEMORY STICK card 18 to be plugged into a standard PCMCIA slot on a PC. However, adapter 15 has an integrated circuit (IC) converter chip 11 within it. Converter chip 11 may be needed to convert the serial data format of MEMORY STICK card 18 to the parallel data format of a 68-pin PCMCIA slot. Inclusion of converter chip 11 in adapter 15 significantly increases the cost and complexity of adapter 15 compared to CF-to-PCMCIA adapter 10 which is a passive adapter without a converter chip.

While the advances in flash memory card technology are useful, the many different card formats present a confusing array of interface requirements to a PC. Different adapters are needed for each of the card formats. PCMCIA card reader 12 can be replaced with other format readers, such as a SMARTMEDIA Card reader, and even some multi-standard readers are available, such as a universal reader from Lexar Media that reads COMPACTFLASH or SMARTMEDIA in addition to PCMCIA.

What is desired is a universal adapter for flash memory cards of several different formats.

SUMMARY

A single-slot multi-flash-card reader is disclosed. The flash-card reader includes an Integrated Device Electronics (IDE) interface for transferring data to a personal computer; and an IDE converter, coupled to the personal computer interface, for converting multiple flashcard interfaces to a format used by the personal computer interface. The multiple flash-card interfaces include a COMPACTFLASH interface and smaller interfaces having fewer pins than the COMPACTFLASH interface. The flash-card reader includes a COMPACTFLASH connector, coupled to the IDE converter, for receiving a COMPACTFLASH card through a single slot in the single-slot multi-flash-card reader, the COMPACTFLASH connector making electrical connection with the COMPACTFLASH card for signals in the COMPACTFLASH interface. The flash-card reader also includes an adapter, having a physical shape to removably insert into the COMPACTFLASH connector. The adapter has a mating COMPACTFLASH connector that fits the COMPACTFLASH connector. The adapter also has a smaller connector, the smaller connector for fitting to other flash memory cards having the smaller interfaces. The reader includes a wiring means, in the adapter, connected between the smaller connector and the mating COMPACTFLASH connector, for directly connecting signals from the smaller connector in the smaller interface with signals in the mating COMPACTFLASH connector. The adapter allows the other flash memory cards having the smaller interfaces to fit into the COMPACTFLASH connector through the single slot to be read by the IDE converter.

A system and method in accordance with one embodiment of the present invention allows an IDE interface to allow a flash reader to be built that could be put into the front panel of a PC in a manner that is similar to placing a CD-ROM into the front panel.

BRIEF DESCRIPTION OF THE DRAWINGS

FIG. 5 is a table of pin mappings for the SMARTMEDIA, MMC/SD, and MEMORY STICK to COMPACTFLASH adapters.

DETAILED DESCRIPTION

Figure 1A:
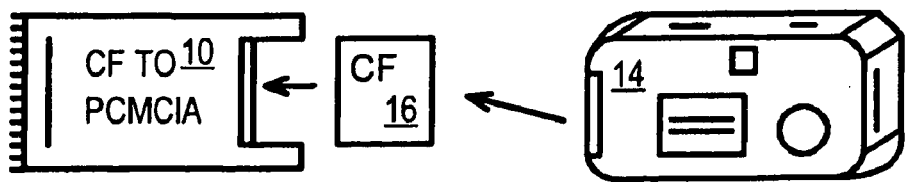
FIG. 1A shows a flash memory card and adapter for transferring images from a digital camera to a PC.
Figure 1B:
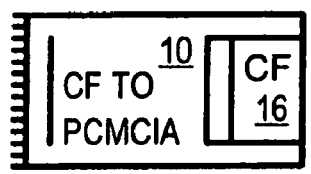
FIG. 1B shows CF-to-PCMCIA adapter 10 with COMPACTFLASH card 16 inserted.
Figure 1C:
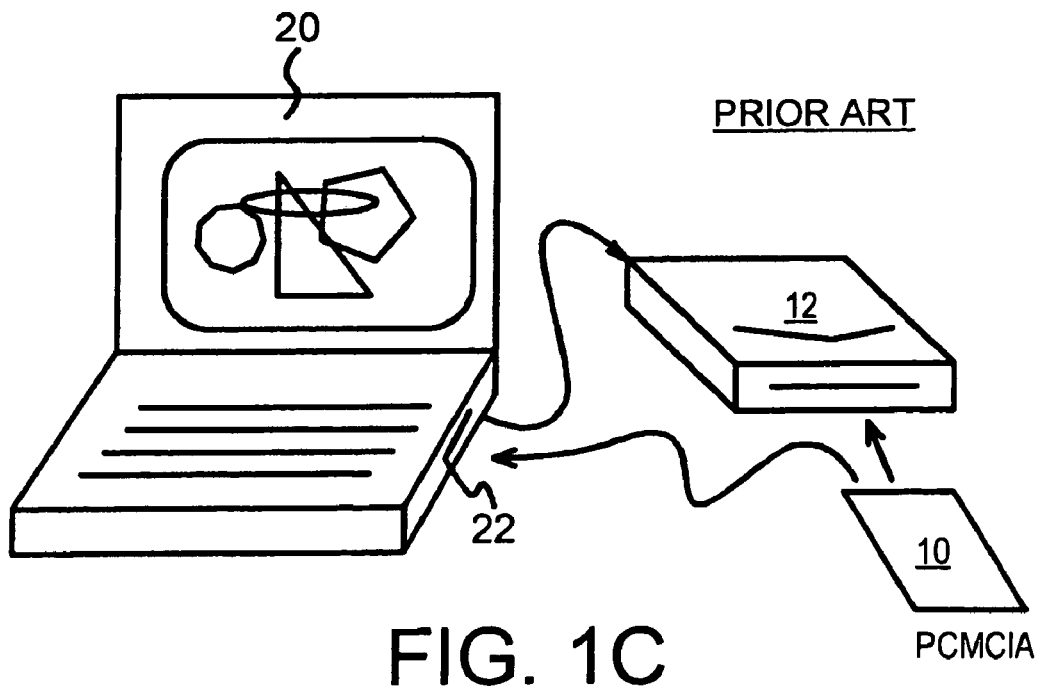
FIG. 1C shows a PC connected to a PCMCIA reader.
Figure 2A:
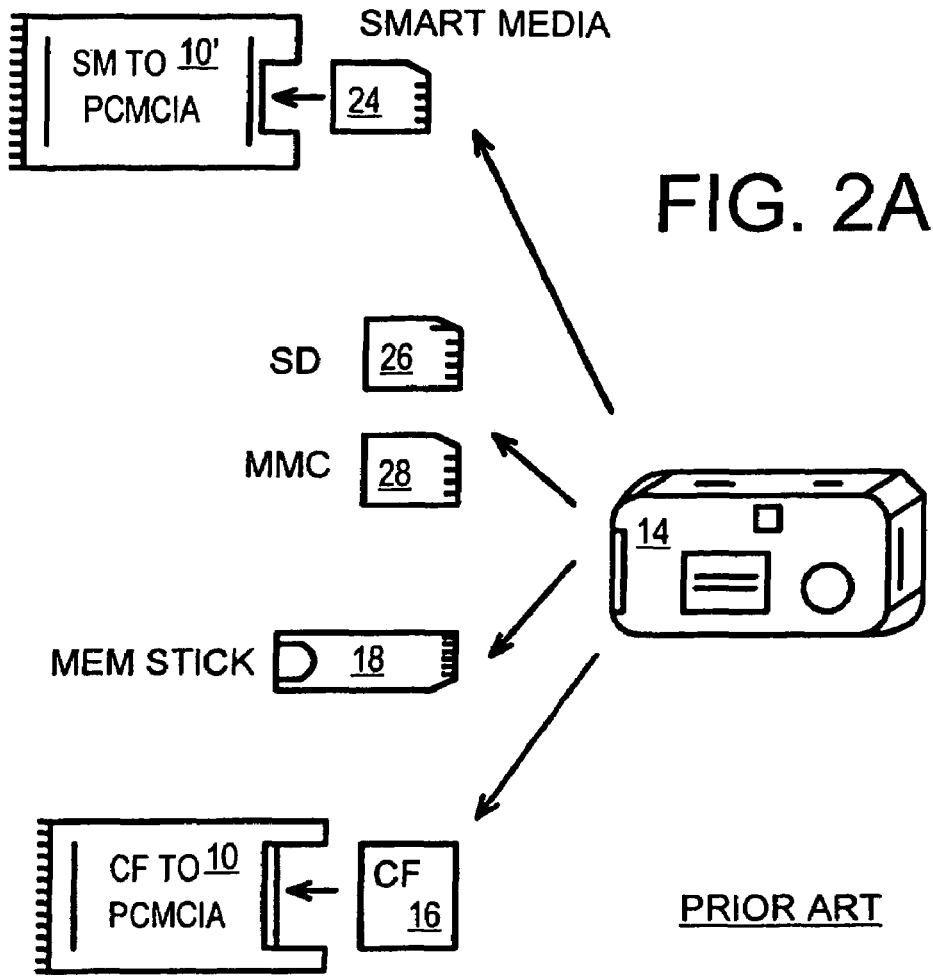
FIG. 2A illustrates various formats of flash memory cards used with digital cameras.
Figure 2B:
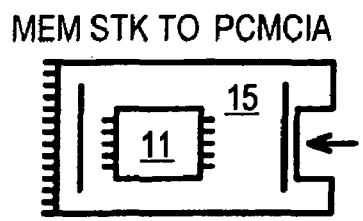
FIG. 2B shows a MEMORY STICK-to-PCMCIA adapter using an active converter chip.

The present invention relates to an improvement in flash memory card readers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

In U.S. patent application Ser. No. 09/610,904, entitled "Flash Toaster For Reading Several Types of Flash-Memory Cards With or Without a PC," filed Jul. 6, 2000 and assigned to the assignee of the present application, a universal adapter is disclosed that can be constructed using the COMPACTFLASH card form factor. A reader that reads COMPACTFLASH cards can then read any of the other flash memory cards that plug into the COMPACTFLASH adapter. The adapters are simple, inexpensive passive adapters without a conversion chip.

In addition, the above-identified application discloses a pin mapping from the smaller flash-card formats to COMPACTFLASH that allows for easy detection of the type of flash memory card inserted into the adapter. Detection of the type of flash memory card is thus performed automatically by electronic detection by the COMPACTFLASH reader. The COMPACTFLASH reader is modified to perform this card-type detection. Signal conversion such as serial-to-parallel is performed by the COMPACTFLASH reader rather than by the adapter. Adapter costs are reduced while COMPACTFLASH reader cost is increased only slightly. The COMPACTFLASH reader can use a single COMPACTFLASH slot to read multiple flash-card types, including SMARTMEDIA, MultiMediaCard, Secure Digital, MEMORY STICK, and COMPACTFLASH.

In another embodiment, the COMPACTFLASH reader is somewhat larger, and has multiple slots. The adapter is not needed in this embodiment. Instead, a slot is provided for each of the flash memory card formats; SMARTMEDIA, MultiMediaCard, Secure Digital, MEMORY STICK, and COMPACTFLASH. A PCMCIA slot can also be added. This COMPACTFLASH reader can be connected to the PC by a USB cable, or it can be located within the PC chassis.

In a third embodiment, the COMPACTFLASH reader is a stand-alone device that can operate without a PC. A removable disk media such as an R/W CD-ROM is included. Images from the flash memory card are copied to the removable disk media by the COMPACTFLASH reader. A simple interface is used, such as having the user press a button to initiate image transfer.

Although the above-identified COMPACTFLASH reader operates effectively for its stated purpose, it cannot be utilized with an Integrated Devices Electronics (IDE) interface effectively in certain circumstances. It is desirable that a COMPACTFLASH reader be utilized with an IDE interface for several reasons. Firstly, the IDE interface is a proven interface and an easy interface to design to, for devices such as digital cameras, printers, etc., which may want to embed this chip in their devices. Secondly, the IDE interface is extremely fast and will boost the transfer rates of the devices. IDE ports are freely available on most systems (since only 2 or at the most 3 of the total of 4 IDE ports are used up). Finally, attaching to the front panel of an IDE interface is possible for 100% of all PCs/Macs, etc., whereas an internal expansion slot for USB is utilized in many newer systems.

A system and method in accordance with one embodiment of the present invention allows an IDE interface to replace the USB interface. This will allow a flash reader to be built that could be put into the front panel of a PC in a manner that is similar to placing a CD-ROM into the front panel. To further describe the features of the present invention, refer now to the following description.

Universal, Passive Adapters

Figure 3A:
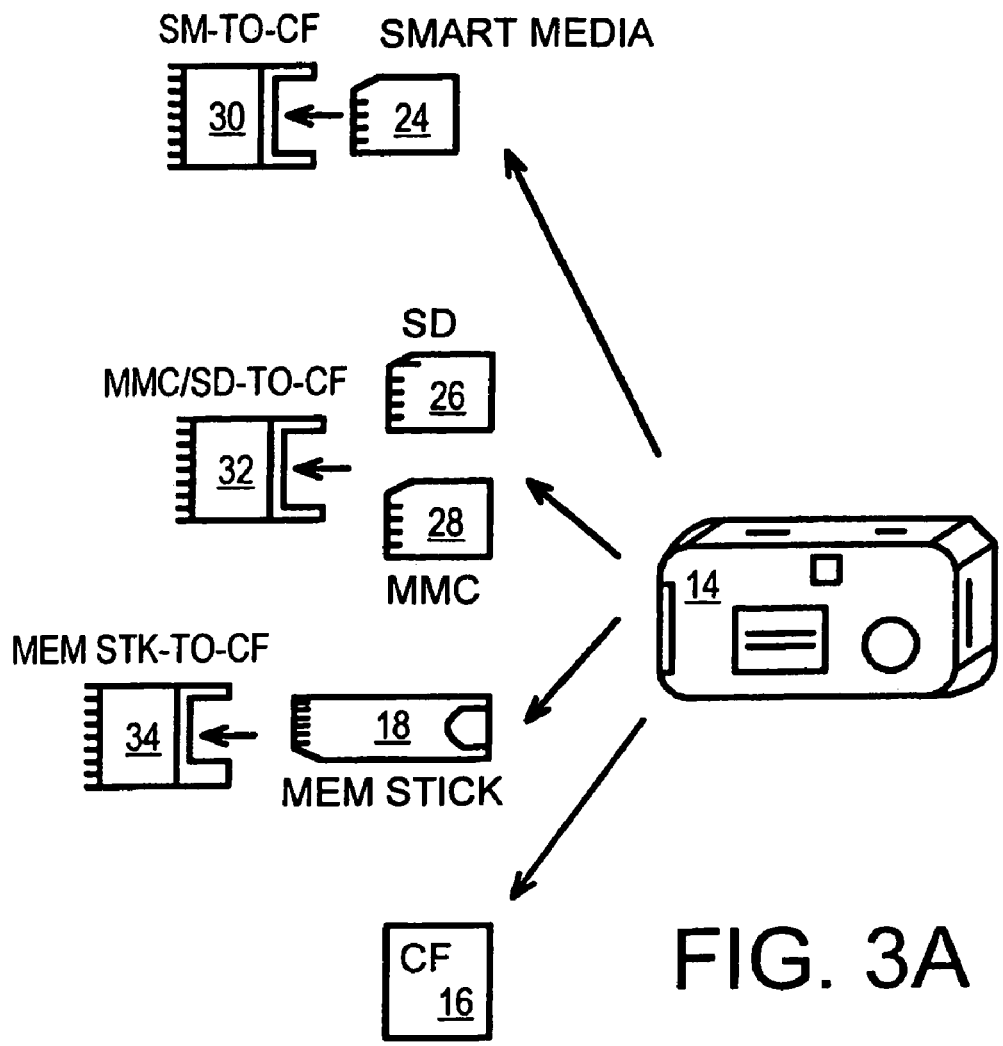
FIG. 3A shows a universal COMPACTFLASH adapter that accepts SMARTMEDIA, MultiMediaCard, Secure Digital, and MEMORY STICK flash memory cards.

FIG. 3A shows a universal COMPACTFLASH adapter that accepts SMARTMEDIA, MultiMediaCard, Secure Digital, and MEMORY STICK flash memory cards. Digital camera 14 stores images on flash memory that is in one of several card types. COMPACTFLASH card 16 uses a 50-pin connector and transfers image data in a 16-bit parallel format.

SMARTMEDIA card 24 is a smaller flash memory card with a 22-pin interface and transfers data in an 8-bit parallel format. SMARTMEDIA adapter 30 converts the 22-pin SMARTMEDIA interface to fit within the 50-pin COMPACTFLASH interface. When SMARTMEDIA card 24 is plugged into SMARTMEDIA adapter 30, both can be plugged into a COMPACTFLASH slot on a COMPACTFLASH reader. Of course, ordinary COMPACTFLASH readers will not be able to read SMARTMEDIA card 24, since special signal conversion is required by the COMPACTFLASH reader.

MultiMediaCard 28 and Secure Digital card 26 are flash memory cards with serial interfaces (MMC is 7-pin while SD is 9-pin). Serial data transfer is used through a single Data I/O pin. MMC/SD adapter 32 has an opening with a 9-pin connector to receive either MultiMediaCard 28 or Secure Digital card 26. Once MultiMediaCard 28 or Secure Digital card 26 is inserted into MMC/SD adapter 32, then MMC/SD adapter 32 can be inserted into a COMPACTFLASH slot on a special COMPACTFLASH reader. The COMPACTFLASH reader then detects the card type and performs serial-to-parallel conversion.

MEMORY STICK 18 is also a flash memory card with a 9-pin, serial-data interface, but is narrower and longer than MultiMediaCard 28 or Secure Digital card 26. MEMORY STICK adapter 34 has an opening with a 10-pin connector to receive MEMORY STICK 18. Once MEMORY STICK 18 is inserted, MEMORY STICK adapter 32 can itself be inserted into a COMPACTFLASH slot on a special COMPACTFLASH reader. The COMPACTFLASH reader then detects the card type and performs serial-to-parallel conversion.

Figure 3B:
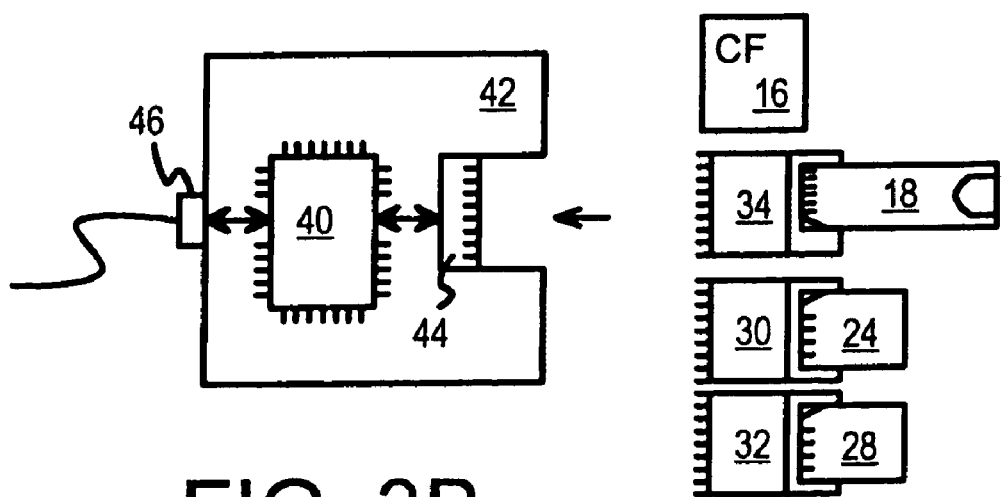
FIG. 3B shows a COMPACTFLASH reader that reads SMARTMEDIA, MultiMediaCard, Secure Digital, and MEMORY STICK flash memory cards through passive adapters to the COMPACTFLASH form factor.

FIG. 3B shows a COMPACTFLASH reader that reads SMARTMEDIA, MultiMediaCard, Secure Digital, and MEMORY STICK flash memory cards through passive adapters to the COMPACTFLASH form factor. COMPACTFLASH reader 42 has an opening or slot with 50-pin connector 44 that accepts COMPACTFLASH card 16. An IDE converter chip 40 performs handshaking with COMPACTFLASH card 16 and performs data transfer. COMPACTFLASH reader 42 also connects to a PC over IDE connector 46. The IDE converter chip 40 also controls the IDE interface to the host PC, allowing image files to be transferred to the PC from COMPACTFLASH card 16.

COMPACTFLASH reader 42 can also read other kinds of flash memory cards. For example, adapter 34 allows MEMORY STICK 18 to be read. MEMORY STICK adapter 34 has an opening that MEMORY STICK 18 fits into, while MEMORY STICK adapter 34 itself fits into 50-pin connector 44, since adapter 34 has the same form factor as a COMPACTFLASH card.

SMARTMEDIA card 24 can also be read by COMPACTFLASH reader 42, using SMARTMEDIA adapter 30. Likewise, MultiMediaCard 28 or Secure Digital card 28 can be read using MMC/SD adapter 32.

Adapters 30, 32, 34 are passive adapters that only connect pins from the smaller flash memory cards to the 50-pin COMPACTFLASH connector. An active converter chip is not required, greatly reducing cost and complexity.

Figure 3C:
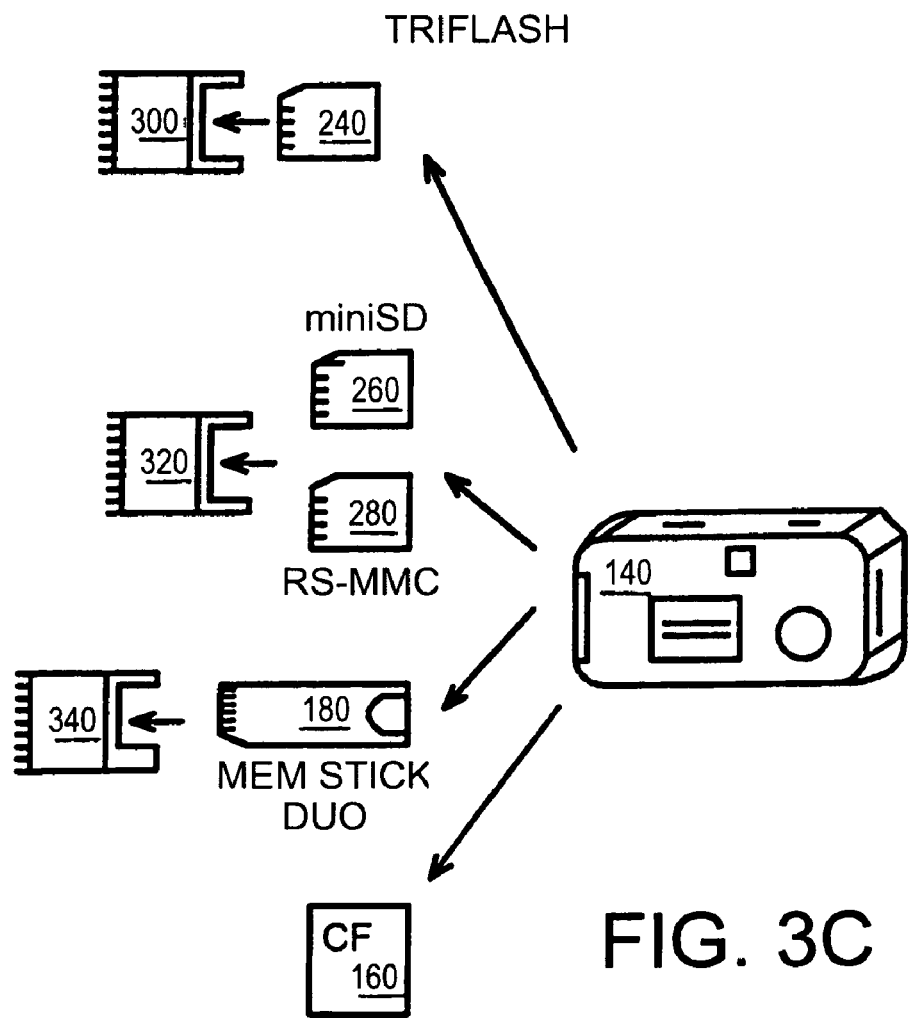
FIG. 3C shows one embodiment of a COMPACTFLASH adapter that accepts TriFlash, RS-MMC, miniSD, and MEMORY STICK Duo flash memory cards.

In an alternative embodiment, a COMPACTFLASH reader that reads small foot print media is included. Some examples of small foot print media include MEMORY STICK Duo, mini Secure Digital (miniSD), TriFlash, Reduced-size MultiMediaCard (RS-MMC), etc. These small foot print media may be electrically the same as MEMORY STICK, Secure Digital (SD), and MultiMediaCard (MMC). FIG. 3C shows one embodiment of a universal COMPACTFLASH adapter that accepts TriFlash 240, RS-MMC 280, miniSD 260, and MEMORY STICK Duo 180 flash memory cards. Digital camera 140 stores images on flash memory that is in one of several card types. COMPACTFLASH card 160 uses a 50-pin connector and transfers image data in a 16-bit parallel format.

The small foot print media may have a smaller interface, and hence, they may be plugged into a corresponding adapter, such as a TriFlash adapter 300, a miniSD or RS-MMC (miniSD/RS-MMC) adapter 320, or a MEMORY STICK Duo adapter 340. The corresponding adapter may be plugged into a COMPACTFLASH slot on a COMPACTFLASH reader.

Figure 3D:
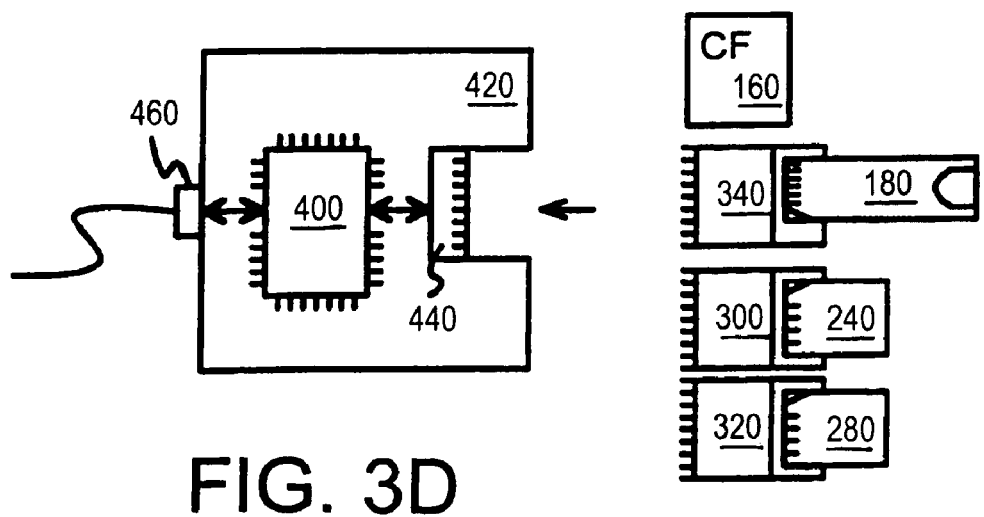
FIG. 3D shows one embodiment of a COMPACTFLASH reader that reads TriFlash, RS-MMC, miniSD, and MEMORY STICK Duo flash memory cards.

FIG. 3D shows one embodiment of a COMPACTFLASH reader that reads TriFlash, RS-MMC, miniSD, and MEMORY STICK Duo flash memory cards through passive adapters to the COMPACTFLASH form factor. COMPACTFLASH reader 420 has an opening or slot with 50-pin connector 440 that accepts COMPACTFLASH card 160. An IDE converter chip 400 performs handshaking with COMPACTFLASH card 160 and performs data transfer. COMPACT- FLASH reader 420 also connects to a PC over IDE connector 460. The IDE converter chip 400 also controls the IDE interface to the PC, allowing image files to be transferred to the PC from COMPACTFLASH card 160.

Other kinds of flash memory cards can also be read by COMPACTFLASH reader 420. For example, adapter 340 allows MEMORY STICK Duo 180 to be read. MEMORY STICK adapter 340 has an opening that MEMORY STICK Duo 180 fits into, while MEMORY STICK adapter 340 itself fits into 50-pin connector 440, since adapter 340 has the same form factor as a COMPACTFLASH card.

TriFlash card 240 can also be read by COMPACTFLASH reader 420, using SMARTMEDIA adapter 300. Likewise, RS-MMC 280 or miniSD card 280 can be read using miniSD/RS-MMC adapter 320.

In one embodiment, adapters 300, 320, 340 are passive adapters that only connect pins from the smaller flash memory cards to the 50-pin COMPACTFLASH connector. An active converter chip is not required, greatly reducing cost and complexity.

Detection of Card Type

FIGS. 4A-E detail detection of the type of flash memory card by the COMPACTFLASH reader. Since the same COMPACTFLASH slot is used for many kinds of flash memory cards, a detection method is useful so that the user doesn't have to explicitly indicate what type of flash memory card is inserted into the COMPACTFLASH reader.

The inventors have carefully examined the pins of the interfaces to the various flash memory cards and have discovered that type-detection can be performed by examining two pins. Pins CE1 and CE2 are the chip enable pins for addressing the 50-pin COMPACTFLASH interface. These pins are normally inputs to the COMPACTFLASH card and thus are driven by the COMPACTFLASH reader. When the reader does not drive CE1, CE2 to the inserted COMPACTFLASH card, the CE1, CE2 pins float or are pulled high by pull-up resistors.

Address pins are not present on the other kinds of flash memory cards. Instead, the address and data are multiplexed. For MMC/SD and MEMORY STICK, the address is sent serially. Using the adapters, pins from the other flash memory cards can be connected to the COMPACTFLASH pins. Pins CE1 and CE2 are used to detect the type of card. For SMARTMEDIA, the addresses are sent by using a special control sequence followed by 3 or 4 bytes of starting address.

Figure 4A:
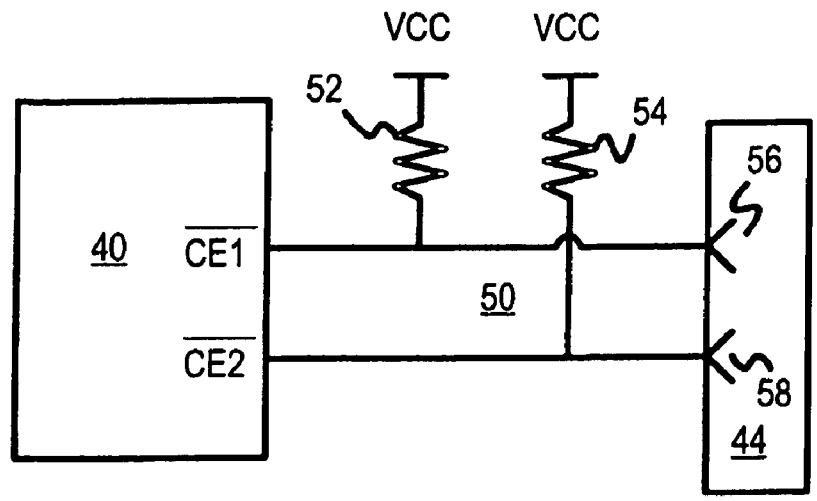
FIGS. 4A-E show card-type detection using the CE2, CE1 pins of the COMPACTFLASH reader interface.

In FIG. 4A, the CE1, CE2 pins of the COMPACTFLASH reader interface are highlighted. The IDE converter chip 40 in the COMPACTFLASH reader normally drives all 11 address pins in the COMPACTFLASH interface when reading a COMPACTFLASH card plugged into connector 44. The CE1 pin from the COMPACTFLASH card plugs into connector cup 56, while the CE2 pin from the COMPACTFLASH card plugs into connector cup 58 of 50-pin connector 44.

Card-type detector 50 has two pull-up resistors added to lines CE1, CE2. Resistor 52 pulls line CE1 high to power (Vcc) when neither the IDE converter chip 40 nor a card plugged into connector 44 drives line CE1. Likewise, resistor 54 pulls line CE2 high when line CE2 is not being actively driven. During detection mode, the IDE converter chip 40 is programmed to not drive lines CE1, CE2 and instead use them as inputs to the detector logic.

Figure 4B:
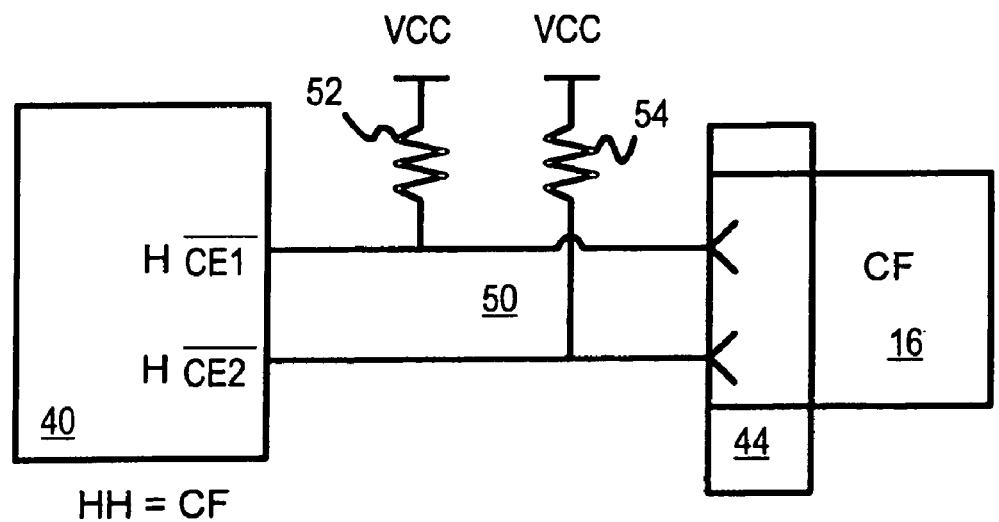

In FIG. 4B, a COMPACTFLASH card is inserted into the connector for card-type detection. COMPACTFLASH card 16 is plugged into connector 44. Since CE1 and CE2 are inputs to COMPACTFLASH card 16, they are not driven by COMPACTFLASH card 16. During detection mode, the IDE converter chip 40 also does not drive pins CE1, CE2. Thus lines CE1, CE2 are left floating and are each pulled high by resistors 52, 54.

Detection logic in the IDE converter chip 40 reads card-select pins CD0, CD1 to detect the presence of a flash memory card. When a new card is present, detection logic then reads pins CE1, CE2 as inputs. Both inputs are high. The detection logic in the IDE converter chip 40 recognizes the HH state of CD1, CE2 as indicating that a COMPACTFLASH card is plugged into connector 44. The IDE converter chip 40 then exits detection mode and configures its interface to connector 44 for the 50-pin COMPACTFLASH interface as shown later in FIG. 5.

Figure 4C:
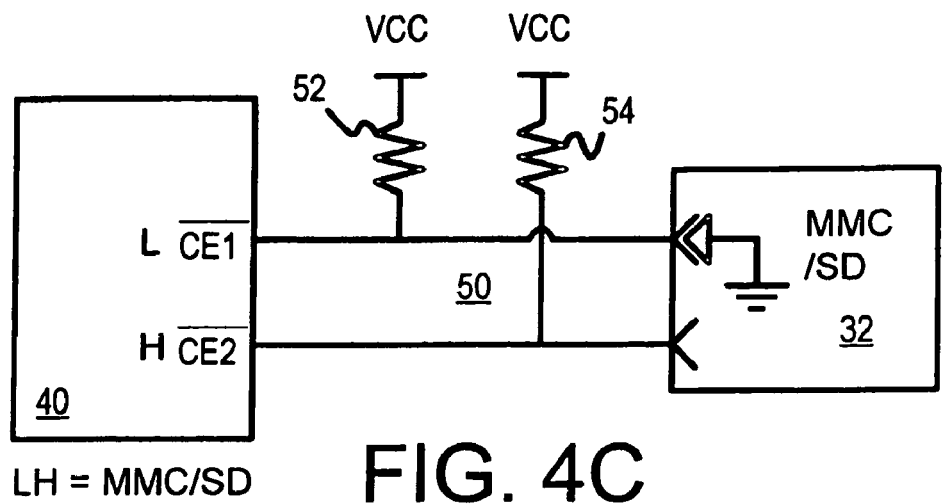

In FIG. 4C, a MultiMediaCard or Secure Digital card is inserted into the connector for card-type detection. MMC/SD card 28 (not shown) is plugged into MMC/SD adapter 32 which is plugged into connector 44.

The IDE converter chip 40 does not drive pins CE2, CE1 during detection mode. Thus pin CE2 floats and is pulled high by resistor 54. The CE1 pin is driven low by the MMC card.

Detection logic in the IDE converter chip 40 reads card-select pins CD0, CD1 to detect the presence of a flash memory card. When a new card is present, detection logic then reads pins CE1, CE2 as inputs. While CE1 is low, CE2 is high. The detection logic in the IDE converter chip 40 recognizes the LH state of CE1, CE2 as indicating that a MMC or SD card is plugged into connector 44. The IDE converter chip 40 then exits detection mode and configures its interface to connector 44 for the 9-pin MMC/SD interface as shown later in FIG. 5.

Figure 4D:
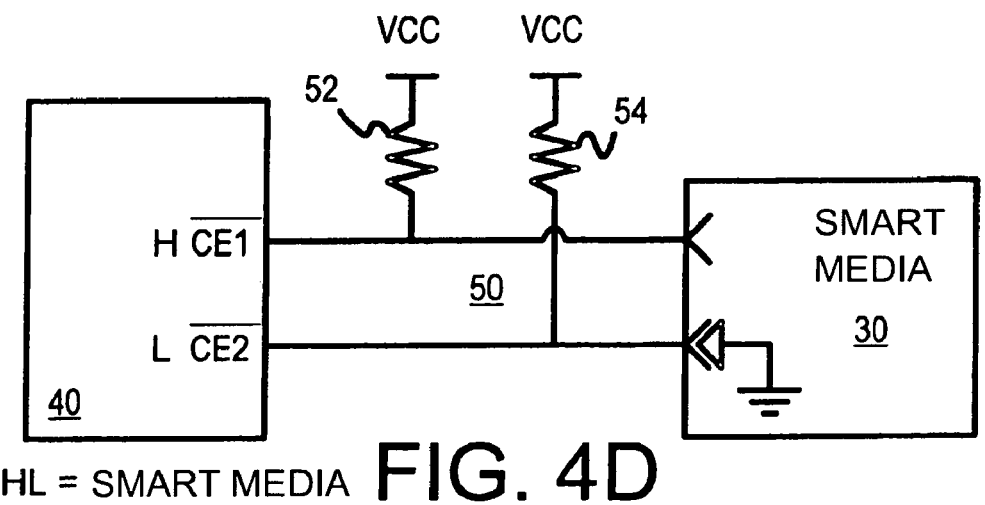

In FIG. 4D, a SMARTMEDIA card is inserted into the connector for card-type detection. SMARTMEDIA card 24 (not shown) is plugged into SMARTMEDIA adapter 30 which is plugged into connector 44. The adapter 30 does not connect pins CE1, CE2 from the COMPACTFLASH interface to any pins on the SMARTMEDIA card. Adapter 30 internally connects pin CE2 from the COMPACTFLASH interface to the ground pin on the COMPACTFLASH interface.

The SMARTMEDIA card does not drive either pin CE2, CE1, although adapter 30 drives pin CE2 low. Likewise, the IDE converter chip 40 does not drive pins CE2, CE1 during detection mode. Pin CE1 floats and is pulled high by resistor 52.

Detection logic in the IDE converter chip 40 reads card-select pins CD0, CD1 to detect the presence of a flash memory card. When a new card is present, detection logic then reads pins CE1, CE2 as inputs. While CE1 is high, CE2 is low. The detection logic in the IDE converter chip 40 recognizes the HL state of CE1, CE2 as indicating that a SMARTMEDIA card is plugged into connector 44. The IDE converter chip 40 then exits detection mode and configures its interface to connector 44 for the 22-pin SMARTMEDIA interface as shown later in FIG. 5.

Figure 4E:
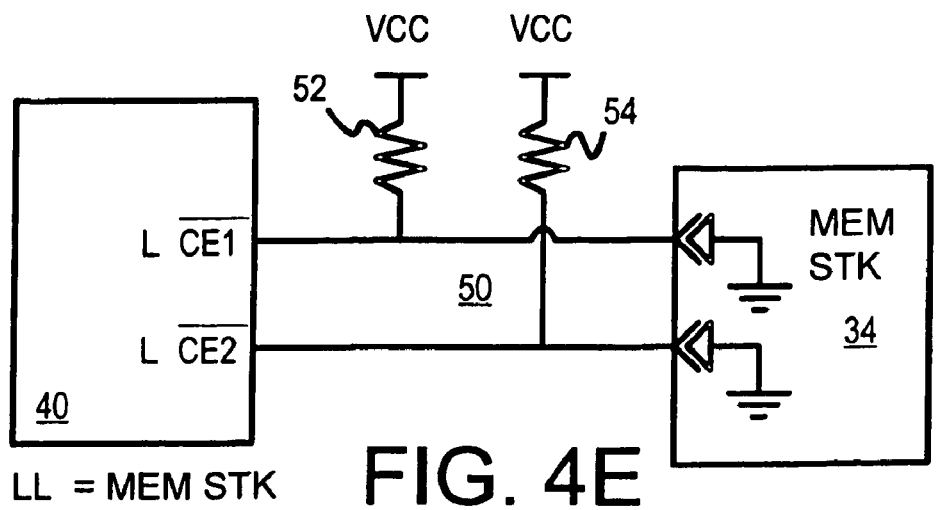

In FIG. 4E, a MEMORY STICK card is inserted into the connector for card-type detection. MEMORY STICK card 18 (not shown) is plugged into MEMORY STICK adapter 34, which is plugged into connector 44.

Detection logic in the IDE converter chip 40 reads card-select pins CD0, CD1 to detect the presence of a flash memory card. When a new card is present, detection logic then reads pins CE1, CE2 as inputs. Both pins CE1, CE2 are low. The detection logic in the IDE converter chip 40 recognizes the LL state of CE1, CE2 as indicating that a MEMORY STICK card is plugged into connector 44.

Pin Mapping

FIG. 5 is a table of pin mappings for the SMARTMEDIA, MMC/SD, and MEMORY STICK to COMPACTFLASH adapters. The pin numbers for the smaller interfaces for SMARTMEDIA, MMC/SD, and MEMORY STICK are not shown but can be in any order or designation. The adapter connects the proper pin on the smaller interface to the COMPACTFLASH pin number shown in FIG. 5. Simple wiring such as individual wires, flat cables, printed-circuit board (PCB), or wiring traces can be used.

The ground pins on the smaller interfaces are connected to COMPACTFLASH pins 1 and 50. Power pins are connected to COMPACTFLASH pins 13, 38. Pins 25, 26 are the card detect signals for COMPACTFLASH, which the adapters connect to the card-detect signals on all smaller interfaces.

The COMPACTFLASH connectors use pins 2-6, 21-23, 27-31, and 47-49 for the 16-bit parallel data bus to the COMPACTFLASH card. Pins 8, 10-12, and 14-20 form a separate 11-bit address bus. The separate data and address buses provide for rapid random addressing of COMPACTFLASH cards. Other control signals include pins 6, 32 chip enables, pin 9 output enable, pin 36 write enable, interrupt pin 37, reset pin 41, and register REG pin 44. REG pin 44 is the Attribute Memory Select, defined based on the CF mode of operation, i.e. PCMCIA I/O mode, IDE or PCMCIA Memory Mode. Several pins in the 50-pin interface are not connected.

The smaller SMARTMEDIA interface also has a parallel data bus of 8 bits. These are mapped to pins 2-6, and 21-23 of the COMPACTFLASH interface to match the COMPACTFLASH D0:7 signals. While no separate address bus is provided, address and data are multiplexed. Control signals for latch enables, write enable and protect, output enable, and ready handshake are among the control signals. Output enable—(OE) and write enable—(WE) are mapped to the same function pins 9, 36 of the COMPACTFLASH interface. The total number of pins in the SMARTMEDIA interface is 22.

The MEMORY STICK and MMC/SD flash memory-card interfaces are smaller still, since parallel data or address busses are not present. Instead, serial data transfers occur through serial data pin DATAIO, which is mapped to pin 19(A1). Data is clocked in synchronization to clock SERCLK on pin 18. A command signal CMD or BITSET occupies pin 20(A0). The MMC/SD and MEMORY STICK interfaces require only 6 pins plus power and ground.

Detection logic in the IDE converter chip 40 reads card-select pins CD0, CD1 to detect the presence of a flash memory card. When a new card is present, detection logic then reads pins CE1, CE2 as inputs to determine the card type. The pull-up resistors of FIG. 4A together with wiring inside the adapter and the card's behavior determines whether CE1, CE2 are pulled low by the adapter or pulled high by the pull-up resistors.

Multi-Slot Multi-Flash-Card Reader

Figure 6A:
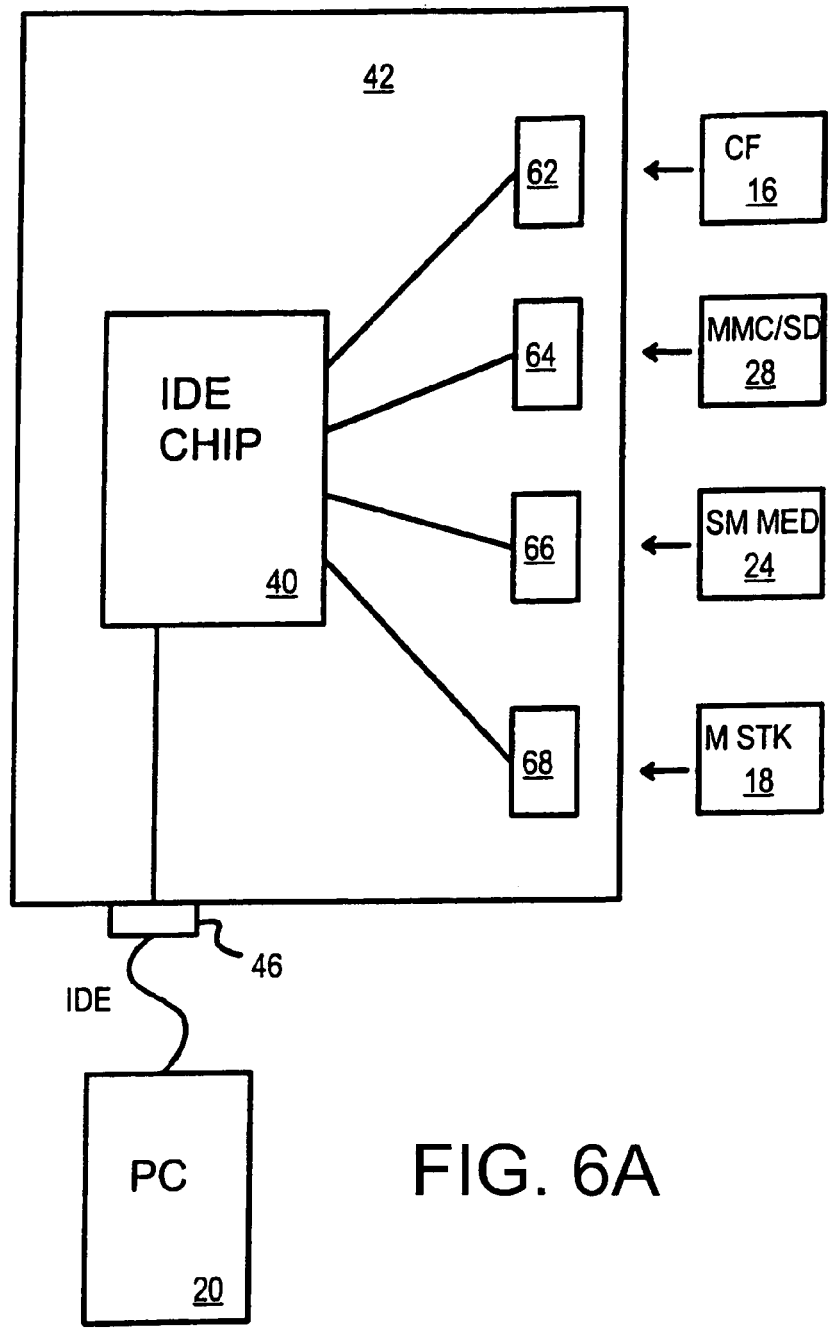
FIG. 6A is a diagram of a multi-slot embodiment of the flash-card reader.

FIG. 6A is a diagram of a multi-slot embodiment of the flash-card reader. While the single-slot embodiment of FIG. 3B results in the smallest physical design, somewhat larger flash-card readers can be made that have separate slots for each type of flash memory card, rather than a single slot. This negates the need for the adapters.

Four connectors are provided in flash reader 42: a 50-pin COMPACTFLASH connector 62 that fits COMPACTFLASH card 16, a 9 pin MMC/SD connector 64 that fits MultiMediaCard 28 or a Secure Digital card, a 22-pin SMARTMEDIA connector 66 that fits SMARTMEDIA card 24, and a 10-pin MEMORY STICK connector 68 that fits MEMORY STICK card 18.

Each of the four connectors 62, 64, 66, 68 route their signals to the IDE converter chip 40. The IDE converter chip 40 detects when a flash memory card has been inserted into one of the connectors 62, 64, 66, 68 and configures itself to read files from the inserted card using the pin interface of FIG. 5 corresponding to the card type.

The IDE converter chip 40 executes various routines to perform handshaking with the flash memory cards and accept data, either serially or in parallel. The data is buffered and then sent to the host PC 20 through IDE connector 46. The IDE converter chip 40 generates the appropriate IDE-interface signals to transfer the data to host PC 20.

Having separate connectors 62, 64, 66, 68 with separate slots in flash reader 42 allows for card-to-card transfers. For example, images or other files from MEMORY STICK card 18 could be transferred to COMPACTFLASH card 16 by the IDE converter chip 40 reading serial data from MEMORY STICK card 18 inserted into connector 68, converting to parallel, and writing to connector 62 and COMPACTFLASH card 16. Each of the flash memory cards in connectors 62, 64, 66, 68 can be assigned a different drive letter by the operating system, such as e:, f:, g:, and h:.

In this embodiment, flash reader 42 is contained in an external housing that connects to host PC 20 through an IDE cable. Of course, other cables and interfaces such as IEEE 1394 FireWire may be substituted.

Figure 6B:
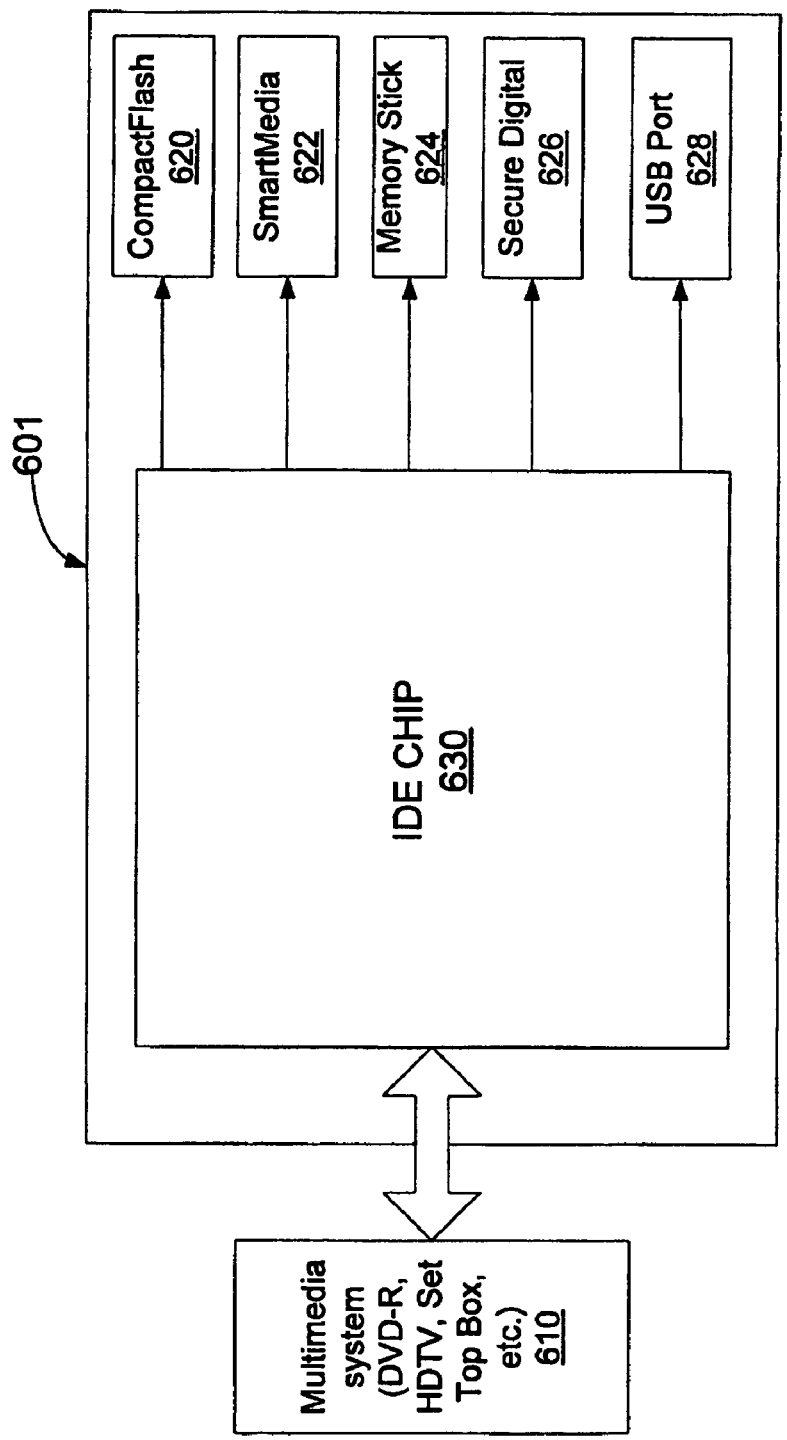
FIG. 6B shows an alternative embodiment of a flash-card reader.

FIG. 6B shows an alternative embodiment of a flash-card reader. The flash-card reader 601 includes an IDE chip 630, a COMPACTFLASH connector 620, a SMARTMEDIA connector 622, a MEMORY STICK connector 624, a Secure Digital connector 626, and a device port 628. The IDE chip 630 may be coupled to a multimedia system 610, such as a DVD-R, HDTV, set-top box, etc.

In one embodiment, the device port 628 may be configured as a host to receive other devices while maintaining IDE hardware on the interface side. For instance, if the host is of a USB type, a device such as a USB DiskOnKey can be plugged into the host and appear as an IDE device to the interface side. The device port 628 may include a variety of ports, such as a USB port, a USB On The Go port, an IEEE 1394 Fire Wire port, or a serial ATA port, etc. Furthermore, the USB port can be made to behave as a USB host or a USB device by software, hardware, or a combination of both. In some embodiments, the device port 628 can arbitrate for either being a host or a device.

Flash Reader Within PC

Figure 7:
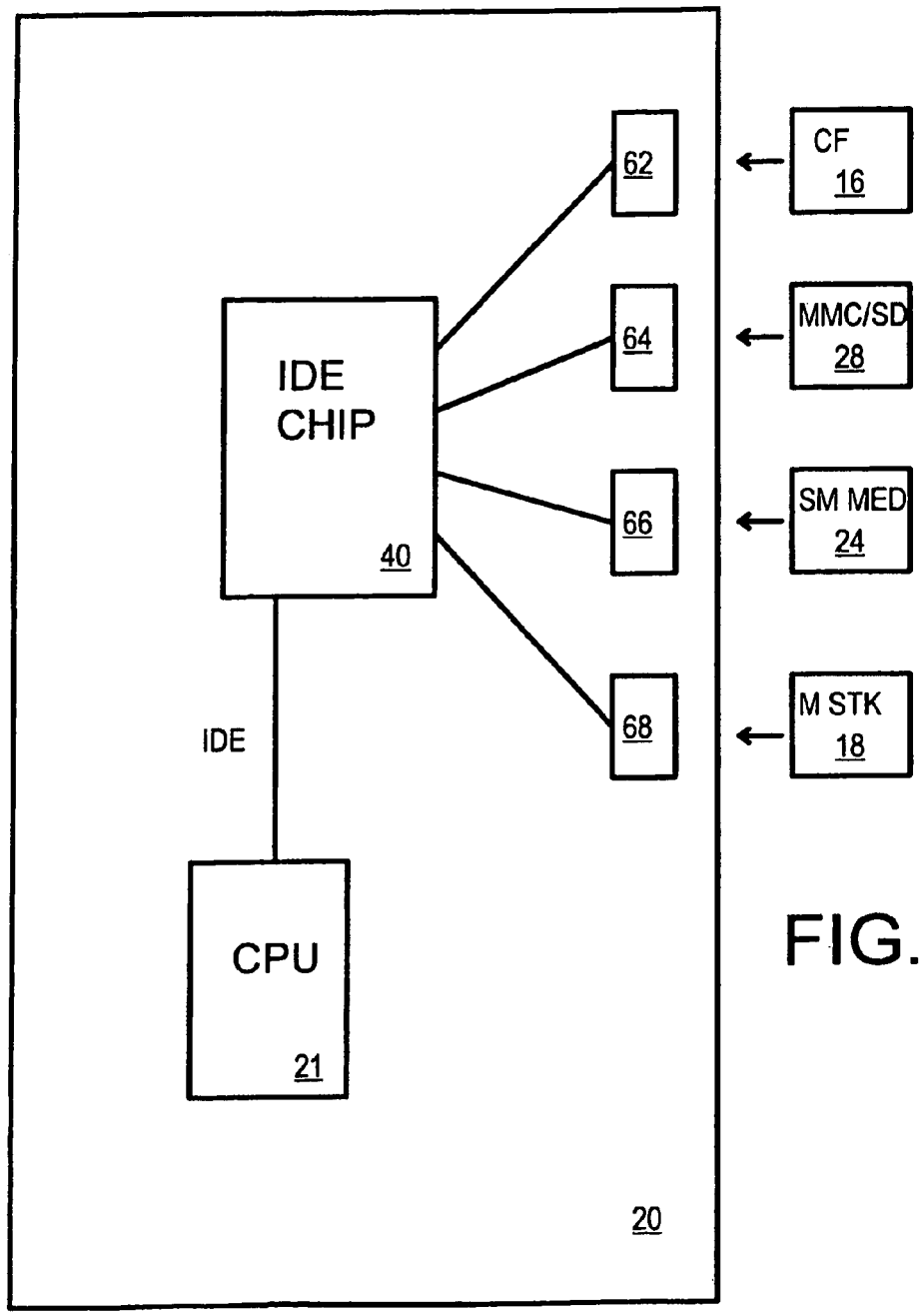
FIG. 7 shows a flash memory reader within a PC.

FIG. 7 shows a flash memory reader within a PC. Four slots and four connectors are provided in flash reader 42. A 50-pin COMPACTFLASH connector 62 fits COMPACTFLASH card 16, a 9-pin MMC/SD connector 64 fits MultiMediaCard 28 or a Secure Digital card, a 22-pin SMARTMEDIA connector 66 fits SMARTMEDIA card 24, and a 10-pin MEMORY STICK connector 68 fits MEMORY STICK card 18.

Each of the four connectors 62, 64, 66, 68 route their signals to the IDE converter chip 40. The IDE converter chip 40 detects when a flash memory card has been inserted into one of the connectors 62, 64, 66, 68 and configures itself to read files from the inserted card using the pin interface of FIG. 5 corresponding to the card type. Each of the flash memory cards in connectors 62, 64, 66, 68 can be assigned a different drive letter by the operating system, such as e:, f:, g:, and h:.

The IDE converter chip 40 executes various routines to perform handshaking with the flash memory cards and accept data, either serially or in parallel. The data is buffered and then sent to the CPU 21 in PC 20 through an internal IDE-interface bus. The IDE converter chip 40 generates the appropriate IDE-interface signals to transfer the data to CPU 21.

Figure 8:
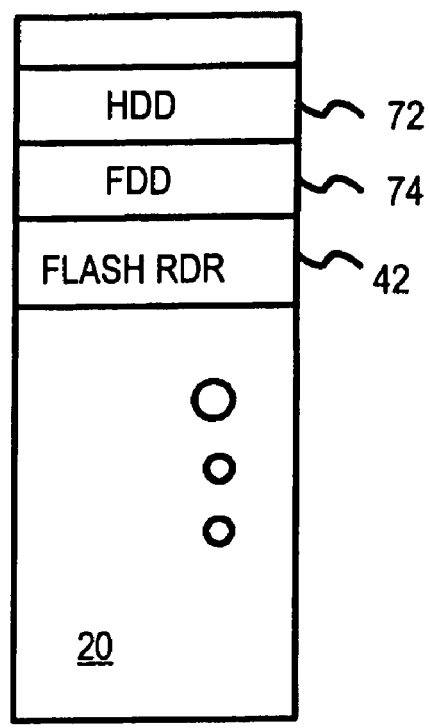
FIG. 8 shows a PC chassis with a flash-card reader in one of the drive bays.

FIG. 8 shows a PC chassis with a flash-card reader in one of the drive bays. PC 20 is enclosed by a chassis or case that has several drive bays allowing the user or manufacturer to insert peripherals such as hard and floppy disk drives, CD-ROM and DVD drives, and tape drives. HDD bay 72 contains a hard-disk drive, while FDD bay 74 contains a floppy disk drive. These are connected by cables to cards inserted into an IDE converter or other expansion bus connectors on the motherboard.

Flash reader 42 is inserted into one of the drive bays. The four slots face forward, allowing the user to insert flash memory cards into flash reader 42 much as a floppy disk is inserted into the floppy-disk drive in FDD bay 74.

Flash reader 42 can be installed by the user from a kit purchased at a store, or it can be pre-installed by an original-equipment manufacturer (OEM) or retailer. The user can easily transfer digital images from a digital camera, regardless of the type of flash-card used by the camera, due to the many different formats of flash memory cards read by flash reader 42.

FlashToaster

Figure 9:
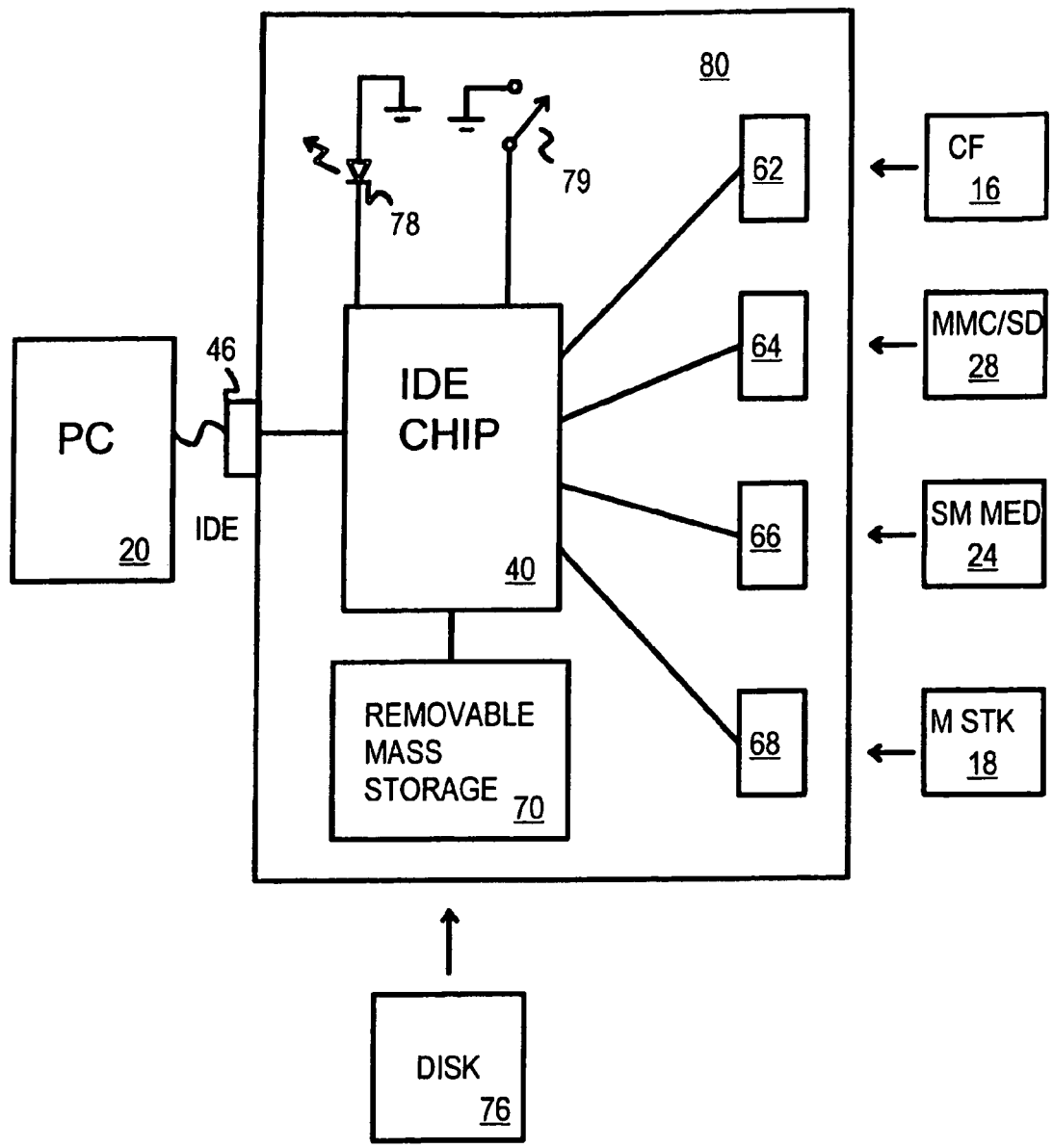
FIG. 9 is a diagram of a stand-alone FlashToaster that accepts several formats of flash memory cards and can copy images to a removable disk without being connected to a host PC.

FIG. 9 is a diagram of a stand-alone FlashToaster that accepts several formats of flash memory cards and can copy images to a removable disk without being connected to a host PC. Digital photographers may not always have their PCs nearby. While extra flash memory cards can be purchased and swapped in the digital camera, these flash memory cards are somewhat expensive, especially when many high-resolution images are captured. Especially during a long trip away from the PC, the user may be limited by the capacity of the flash memory cards.

FlashToaster 80 has four slots and four connectors. A 50-pin COMPACTFLASH connector 62 fits COMPACT-FLASH card 16, a 9-pin MMC/SD connector 64 fits Multi-MediaCard 28 or a Secure Digital card, a 22-pin SMARTMEDIA connector 66 fits SMARTMEDIA card 24, and a 10-pin MEMORY STICK connector 68 fits MEMORY STICK 18.

Each of the four connectors 62, 64, 66, 68 route their signals to the IDE converter chip 40. The IDE converter chip 40 detects when a flash memory card has been inserted into one of the connectors 62, 64, 66, 68 by sensing card select lines CD0, CD1 and configures itself to read files from the inserted card using the pin interface of FIG. 5 corresponding to the card type.

The IDE converter chip 40 executes various routines to perform handshaking with the flash memory cards and accept data, either serially or in parallel. The data is buffered and then sent either to host PC 20 through IDE connector 46 or to removable mass storage 70. The IDE converter chip 40 generates the appropriate signals to transfer the data to host PC 20. The IDE converter chip 40 also generates the control signals for removable mass storage 70, allowing the image data read from the flash memory card to be written to removable disk 76. Removable disk 76 could be a standard or a high-density floppy diskette, a tape drive, a write-able CD-R/W disk, or other proprietary media such as LS 120 by Imation Corporation of Oakdale, MN, or ZIP drives by Iomega Corporation of Roy, UT.

Each of the flash memory cards in connectors 62, 64, 66, 68 can be assigned a different drive letter by the operating system, such as e:, f:, g:, and h:. Removable mass storage 70 can also be assigned a drive letter.

When FlashToaster 80 is not attached to host PC 20, image files may still be copied to removable mass storage 70. Flash-Toaster 80 may be carried along on a trip by the user, allowing the user to download image files to removable disk 76. Since removable disk 76 ordinarily has a much higher capacity than the flash memory cards, many pictures may be captured when no access to host PC 20 is available. FlashToaster 80 can be provided with battery power or with its own AC converter.

FlashToaster 80 is provided with a simple user interface, including light-emitting diode LED 78 and button 79. When the user inserts a flash memory card into one of connectors 62, 64, 66, 68, and removable disk 76 is inserted into removable mass storage 70, the user presses button 79. This activates the IDE converter chip 40, which determines which of connectors 62, 64, 66, 68 has a memory card inserted, and copies the image files to removable mass storage 70. LED 78 can be programmed to blink during the copying process, and remain lit when the copying is complete, or vice-versa. This provides a simple visual indication to the user of the copying progress. Errors can be indicated with additional LED indicator lamps, or other blinking arrangements or colors.

IDE Converter Chip 40

Figure 10:
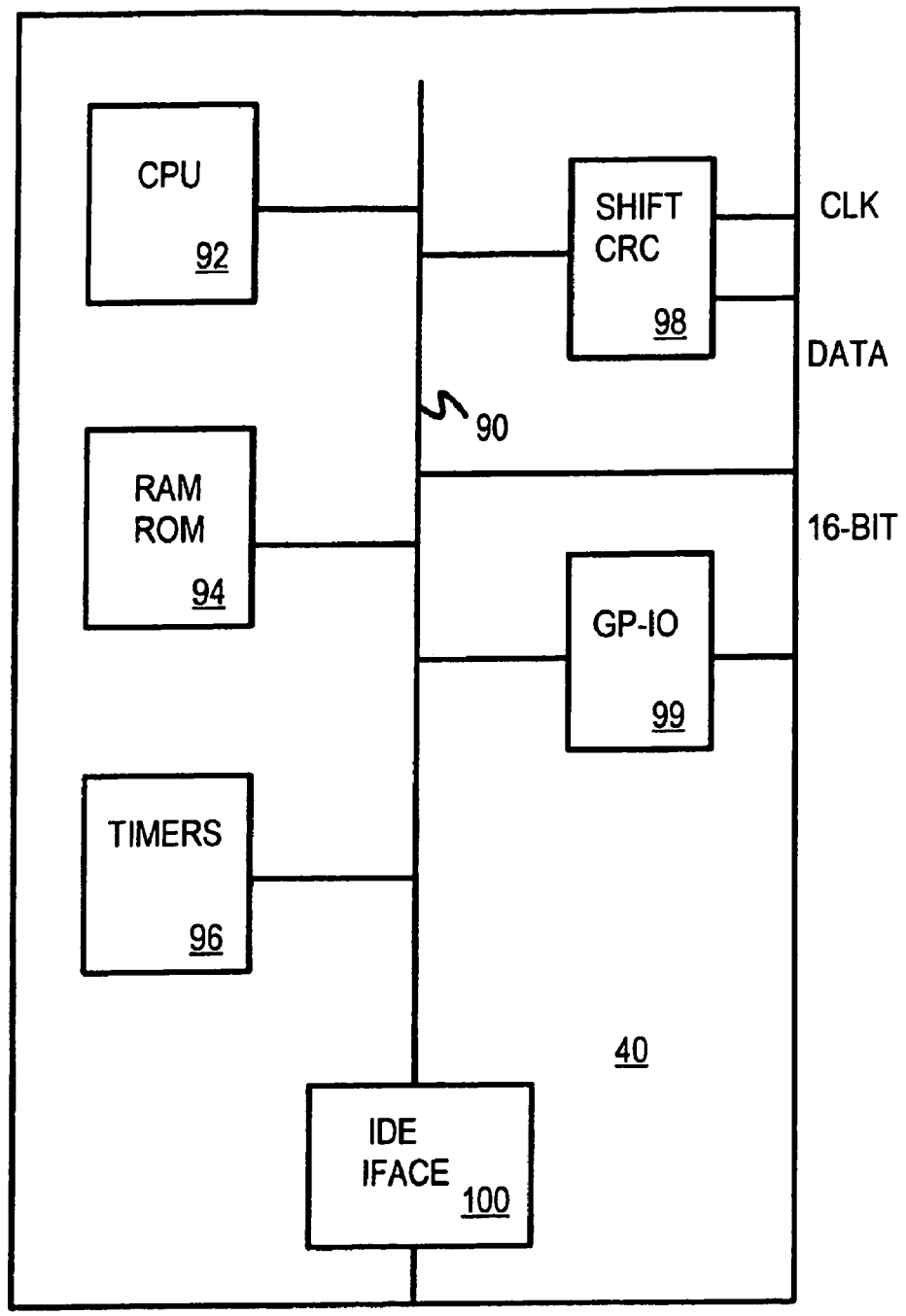
FIG. 10 is a diagram of the IDE converter chip for the flash memory reader.

FIG. 10 is a diagram of the IDE converter chip 40 for the flash memory reader. The IDE converter chip 40 can be implemented as a commercially-available micro-controller chip that is programmed to read and write I/O pins that are connected to the flash memory-card connectors and the IDE interface. Several different control and transfer routines are written and programmed into RAM/ROM 94. CPU 92 then executes these routines. A high-level scanning routine can sense when a flash memory card is inserted. CPU 92 can then begin execution of another routine specific to that type of flash memory card. Transfer and handshake sub-routines can then be called.

In some embodiments, the IDE converter chip 40 adopts one or more software command protocol(s). Some examples of the command protocols include AT Attachment Interface (ATA), AT Attachment Packet Interface (ATAPI), etc.

General-purpose input-output GPIO 99 provides registers or I/O ports that drive external I/O pins of the IDE converter chip 40, or read the logic-levels or voltages on input pins to the IDE converter chip 40. CPU 92 can read registers in GPIO 99 that are written by control signals that are coupled to I/O pins of the IDE converter chip 40 from connectors 62, 64, 66, 68. Control signals to the flash memory cards can be switched high or low by writing a 1 or a 0 to a register for that control signal in GPIO 99.

Timers 96 are useful for asserting control signals for a required amount of time. For example, a control signal may need to be asserted for a specified number of microseconds. CPU 92 can write a 1 to a register in GPIO 99 and start a timer in timers 96. Timer 6 can sent an interrupt to CPU 96 when the specified time has elapsed, or CPU 92 can continuously or periodically poll timers 96 to determine when the specified time has elapsed. Then CPU 92 can write a 0 to the register in GPIO 99, causing the control signal to transition from 1 to 0.

Shifter 98 is connected to the data and clock signals from connectors 64, 68. When data is read from the flash memory card, a clock is pulsed to synchronize the data transfer. Shifter 98 clocks in one bit (serial) or word (parallel) of data for each clock pulse. A cyclical-redundancy-check (CRC) can be performed on the data to detect errors. CPU 92 can request re-transmission of data from the flash memory card when an error is detected.

Data read by shifter 98 can be sent over internal bus 90 to be stored in a buffer in RAM/ROM 94. Later, CPU 92 can execute a routine to transfer this data from RAM/ROM 94 to IDE interface 100. IDE interface 100 then transmits the data over an external IDE link to a host PC. When a removable mass storage is present, some of the I/O pins from GPIO 99 can connect to the removable mass storage, or a separate disk controller can be included on IDE converter chip 40.

As is well known, IDE interface only supports one drive per connector. Accordingly, in a system and method in accordance with the present invention, special IDE commands must be provided to allow the interface to be expanded. Typically, there are two slots in a PC, a Master slot and a Slave slot. Accordingly, in a preferred embodiment, two new commands from the CPU 92 are needed, a first command to awaken the device by the converter chip and a second command to identify the device.

The first command which awakens a MultiLUN device such as a COMPACTFLASH+SMARTMEDIA+Memory-Stick+MultiMediaCard+Secure Digital Card reader would be described as follows:

0 nn 0 0 0 0 mm 0xFE where:

nn is set to 1 to awaken the device and 0 to make the device go to sleep (by default it would be asleep). This can be achieved by asserting a pin on the chip to be low at power up so it would stay inactive until it sees the "wake-up" command.

mm is 0xE0 if the device is connected as Master and 0xF0 it is a Slave.

The second command for reading/writing to the RAM/ROM 94 loads a plurality of registers as follows:

0 nn y 0 0 0 mm 0xFD where:

nn is the number of bytes to write/read y is 1 for read and 0 for a write mm is 0xE0 if the device is connected as Master slot and 0xF0 if the device is connected as a Slave slot.

Accordingly, through the present invention, the Master and Slave slots are expanded to handle multiple devices via the IDE converter.

ADVANTAGES OF THE INVENTION

A universal adapter for flash memory cards accepts cards of several different formats. The adapter accepts SMARTMEDIA, MultiMediaCard, Secure Digital, and MEMORY STICK cards. The flash-card reader with a single slot accepts any format card using the adapter. Special detection logic on the flash reader distinguishes between the many flash-card formats. The low-cost passive adapter does not need an expensive converter chip. A multi-format reader is ideal for use with a PC. However, a stand-alone flash reader can copy image files from flash-cards without a PC. Additionally, preparation of media for use in devices (format and erase operations) can be done using this reader.

A universal adapter is constructed using the COMPACTFLASH card form factor. A reader that reads COMPACTFLASH cards can then read any of the other flash memory cards that plug into the COMPACTFLASH adapter. The adapters are simple, inexpensive passive adapters without a conversion chip.

The disclosed pin mapping from the smaller flash-card formats to COMPACTFLASH allows for easy detection of the type of flash memory card inserted into the adapter. Detection of the type of flash memory card is thus performed automatically by electronic detection by the COMPACTFLASH reader. The COMPACTFLASH reader is modified to perform this card-type detection. Signal conversion such as serial-to-parallel is performed by the COMPACTFLASH reader rather than by the adapter. Adapter costs are reduced while COMPACTFLASH reader cost is increased only slightly. The COMPACTFLASH reader can use a single COMPACTFLASH slot to read multiple flash-card types, including SMARTMEDIA, MultiMediaCard, Secure Digital, MEMORY STICK, COMPACTFLASH, etc.

ALTERNATE EMBODIMENTS

In some alternative embodiments, different flash-card formats can be supported, such as Smart Cards, and more or less than the four slots shown in the multi-card flash reader can be included. Other adapters can be used for newer flash formats for the single-slot COMPACTFLASH reader. Any device that needs Control Bus, Clock, Data Bus and Address Bus can be designed to fit into this slot. Examples of such devices include (but are not limited to) DSL modems, fingerprint security devices, miniature hard disks, digital cameras, video cameras etc.

While the invention has been described as connecting to a personal computer PC host, the host may also be an Apple computer such as the iMAC or G3. The host may also be a SUN computer, or any host computer using IDE interfaces. The invention can also apply to Personal Digital Assistants (PDAs) such as those manufactured by Palm, Inc. or other handheld appliances, such as a cell phone with IDE capability.

The term "COMPACTFLASH reader" has been used for simplicity, since digital images are often read from the flash memory card and then written to the PC. However, the COMPACTFLASH reader is capable of reading files from the PC or from another flash memory card and writing the file to the flash memory card. Thus the COMPACTFLASH reader is really a reader/writer.

In another embodiment, the COMPACTFLASH reader is a stand-alone device that can operate without a PC. A removable disk media such as an R/W CD-ROM is included. Images from the flash memory card are copied to the removable disk media by the COMPACTFLASH reader. A simple interface is used, such as having the user press a button to initiate image transfer.

In some embodiments, the COMPACTFLASH reader/multi-flash reader can be designed into a self-hosted appliance such as an MP3 player, a keyboard, a monitor or a stereo appliance. Additionally, the COMPACTFLASH/multi-flash reader can also be designed into handheld data collection scanner devices. The COMPACTFLASH/multi-flash reader can also be designed into personal digital assistant devices, pocket personal computer devices that use, for example, MICROSOFT WINDOWS OR PALM OS operating systems. The COMPACTFLASH/multi-flash reader can also be designed into hand terminal devices, personal communicator devices, advanced two-way pager devices, audio recorder and player devices.

In addition, the COMPACTFLASH/multi-flash reader could be designed into monitoring devices for various purposes. The devices include, but are not limited to, any device which requires a PC or paper readout, projector devices, industrial computer devices, printer devices, human input devices, medical devices and digital picture frame devices. These monitoring devices, for example, could be pacemakers, fetal monitors, insulin monitors, chemical monitors, seismic monitors, or the like.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A memory card reader comprising:
a single-slot configured to receive a first memory card type without an adapter, and to receive one or more second types of memory cards via a passive adapter, the second types of memory cards having fewer interface pins than the first memory card type;
an Integrated Device Electronics (IDE) interface for transferring data to a system; and
an IDE converter, coupled to the IDE interface and the single slot, to interface with one of the first or second types of memory cards inserted in the single slot and to convert signals from an inserted memory card to a format for the IDE interface, the converter to detect an inserted card by reading one or more card select pins of the single slot, and to identify a type of card inserted in the slot based on reading one or more enable pins of the single slot.

2. The reader of claim 1, wherein the first type of memory card is COMPACTFLASH.

3. The reader of claim 1, wherein the adapter has a physical shape to be removably inserted into the single slot.

4. The reader of claim 3, wherein the adapter includes a first mating connector to couple with an interface of the single slot, and a second connector for fitting to memory cards having interfaces smaller than the first type of memory card.

5. The reader of claim 1, wherein the enable pins of the single slot comprise CE1 and CE2 pins of a COMPACTFLASH interface.

6. The reader of claim 4, wherein the adapter is to couple card select signals from the second connector to card select signals of the interface of the single slot.

7. The reader of claim 2, wherein the second memory card types having fewer interface pins than COMPACTFLASH comprise one of a MultiMediaCard, a Secure Digital card, or a MEMORY STICK.

8. The reader of claim 1, wherein the IDE converter further comprises: a serial-to-parallel converter to receive serial data from a memory card inserted in the single slot and to convert the serial data to a parallel data format for transfer to the system via the IDE interface.

9. The reader of claim 1, wherein the IDE interface and the IDE converter use one of AT Attachment Interface (ATA) protocol and AT Attachment Packet Interface (ATAPI) protocol.

10. The reader of claim 1, further comprising: a device port coupled to the IDE converter to receive one or more non-IDE devices and connect a non-IDE device as an IDE device to the IDE converter.

11. The reader of claim 10, wherein the device port includes at least one of a Universal Serial Bus (USB) port, a USB On The Go port, a Fire Wire (IEEE 1394) port, and a Serial AT Attachment Interface (ATA) port.

12. The reader of claim 10, wherein the device port includes a Universal Serial Bus (USB) port configurable as a USB Host or a USB Device.

13. The reader of claim 2, wherein the second memory card types having fewer interface pins than COMPACTFLASH comprise one of a MEMORY STICK Duo, a miniSD, a Tri-Flash, and a Reduced Size MultiMediaCard (RS MMC).

14. A controller comprising:
a first interface to a single-slot to receive a first memory card type without an adapter, and to receive one or more second types of memory cards via a passive adapter, the second types of memory cards having fewer interface pins than the first memory card type;
an Integrated Device Electronics (IDE) interface for transferring data to a system; and
an IDE converter, coupled to the IDE interface and the first interface, to interface with one of the first or second types of memory cards inserted in the single slot and to convert signals from an inserted memory card to a format for the IDE interface, the converter to detect an inserted card by reading one or more card select pins of the single slot, and to identify a type of card inserted in the slot based on a reading one or more enable pins of the single slot.

* * * * *